(12) United States Patent
Maes

(10) Patent No.: US 9,509,790 B2
(45) Date of Patent: Nov. 29, 2016

(54) GLOBAL PRESENCE

(75) Inventor: Stéphane H. Maes, Fremont, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 12/957,740

(22) Filed: Dec. 1, 2010

(65) Prior Publication Data

US 2011/0145347 A1 Jun. 16, 2011

Related U.S. Application Data

(60) Provisional application No. 61/286,976, filed on Dec. 16, 2009.

(51) Int. Cl.
*G06F 15/16* (2006.01)
*H04L 29/08* (2006.01)

(52) U.S. Cl.
CPC ..................................... *H04L 67/24* (2013.01)

(58) Field of Classification Search
CPC . H04L 12/5815; H04L 51/043; H04L 67/24; H04L 29/08684
USPC ............................... 709/206, 227; 379/88.12
See application file for complete search history.

(56) References Cited

U.S. PATENT DOCUMENTS

| | | |
|---|---|---|
| 5,414,812 A | 5/1995 | Filip et al. |
| 5,613,060 A | 3/1997 | Britton et al. |
| 5,699,513 A | 12/1997 | Feigen et al. |
| 5,737,321 A | 4/1998 | Takahashi |
| 5,786,770 A | 7/1998 | Thompson |
| 5,850,517 A | 12/1998 | Verkler et al. |

(Continued)

FOREIGN PATENT DOCUMENTS

| | | |
|---|---|---|
| EP | 2 034 748 A1 | 3/2009 |
| WO | WO 2007134468 A1 | 11/2007 |

(Continued)

OTHER PUBLICATIONS

3rd Generation Partnership Project 2, "Presence Service: Architecture and Functional Description", doc. No. 3GPP2 X.S50027-001-0, published on Sep. 2004.*

(Continued)

*Primary Examiner* — Khaled Kassim
*Assistant Examiner* — Zhaohui Yang
(74) *Attorney, Agent, or Firm* — Kilpatrick Townsend & Stockton LLP

(57) ABSTRACT

Embodiments of the invention provide systems and methods for providing presence information for a principal without a presence or other user agent. More specifically, embodiments of the present invention provide for publication of presence information independent of a presence agent or other user agent, presence network, or presence server as well as subsequent ways for authorized presence watchers to subscribe to presence and receive notification or query presence information for a principal. Stated another way providing presence information for a principal can comprise receiving presence information related to a first entity from a device without a presence agent at a presence information service and providing the presence information related to the first entity from the presence information service to a second entity.

10 Claims, 6 Drawing Sheets

(56) References Cited

U.S. PATENT DOCUMENTS

| | | |
|---|---|---|
| 5,867,665 A | 2/1999 | Butman et al. |
| 5,946,634 A | 8/1999 | Korpela |
| 6,115,690 A | 9/2000 | Wong |
| 6,119,104 A | 9/2000 | Brumbelow |
| 6,128,645 A | 10/2000 | Butman et al. |
| 6,157,941 A | 12/2000 | Verkler et al. |
| 6,163,800 A | 12/2000 | Ejiri |
| 6,192,231 B1 | 2/2001 | Chapman et al. |
| 6,192,414 B1 | 2/2001 | Horn |
| 6,230,271 B1 | 5/2001 | Wadlow et al. |
| 6,272,556 B1 | 8/2001 | Gish |
| 6,275,857 B1 | 8/2001 | McCartney |
| 6,336,138 B1 | 1/2002 | Caswell et al. |
| 6,374,305 B1 | 4/2002 | Gupta et al. |
| 6,463,462 B1 | 10/2002 | Smith et al. |
| 6,466,984 B1 | 10/2002 | Naveh et al. |
| 6,496,864 B1 | 12/2002 | McCartney |
| 6,553,108 B1 | 4/2003 | Felger |
| 6,578,159 B1 | 6/2003 | Kitagawa et al. |
| 6,611,812 B2 | 8/2003 | Hurtado et al. |
| 6,611,867 B1 | 8/2003 | Bowman-Amuah |
| 6,633,560 B1 | 10/2003 | Albert et al. |
| 6,748,570 B1 | 6/2004 | Bahrs et al. |
| 6,792,605 B1 | 9/2004 | Roberts et al. |
| 6,813,278 B1 | 11/2004 | Swartz et al. |
| 6,823,338 B1 | 11/2004 | Byrne et al. |
| 6,868,413 B1 | 3/2005 | Grindrod et al. |
| 6,965,902 B1 | 11/2005 | Ghatate |
| 6,978,348 B2 | 12/2005 | Belknap et al. |
| 6,981,023 B1 | 12/2005 | Hamilton et al. |
| 6,985,939 B2 | 1/2006 | Fletcher et al. |
| 6,990,491 B2 | 1/2006 | Dutta et al. |
| 7,003,578 B2 | 2/2006 | Kanada et al. |
| 7,042,988 B2 | 5/2006 | Juitt et al. |
| 7,043,538 B2 | 5/2006 | Guedalia et al. |
| 7,051,092 B2 | 5/2006 | Lenz et al. |
| 7,072,653 B1 | 7/2006 | Sladek et al. |
| 7,073,055 B1 | 7/2006 | Freed et al. |
| 7,089,317 B2 | 8/2006 | Jeyaraman et al. |
| 7,092,385 B2 | 8/2006 | Gallant et al. |
| 7,106,848 B1 | 9/2006 | Barlow et al. |
| 7,111,060 B2 | 9/2006 | Araujo et al. |
| 7,114,146 B2 | 9/2006 | Zhang et al. |
| 7,114,148 B2 | 9/2006 | Irving et al. |
| 7,133,669 B2 | 11/2006 | Nair et al. |
| 7,143,094 B2 | 11/2006 | Arroyo et al. |
| 7,146,616 B2 | 12/2006 | Dorner et al. |
| 7,185,333 B1 | 2/2007 | Shafron |
| 7,185,342 B1 | 2/2007 | Carrer et al. |
| 7,194,482 B2 | 3/2007 | Larkin et al. |
| 7,222,148 B2 | 5/2007 | Potter et al. |
| 7,222,334 B2 | 5/2007 | Casati et al. |
| 7,266,600 B2 | 9/2007 | Fletcher et al. |
| 7,269,162 B1 | 9/2007 | Turner |
| 7,269,431 B1 | 9/2007 | Gilbert |
| 7,272,625 B1 | 9/2007 | Hannel et al. |
| 7,281,029 B2 | 10/2007 | Rawat |
| 7,295,532 B2 | 11/2007 | Haller et al. |
| 7,302,570 B2 | 11/2007 | Beard et al. |
| 7,340,508 B1 | 3/2008 | Kasi et al. |
| 7,409,707 B2 | 8/2008 | Swander et al. |
| 7,411,943 B2 | 8/2008 | Kittredge et al. |
| 7,415,010 B1 | 8/2008 | Croak et al. |
| 7,426,381 B2 | 9/2008 | Maes |
| 7,433,838 B2 | 10/2008 | Welsh et al. |
| 7,443,972 B1 | 10/2008 | Barlow et al. |
| 7,444,620 B2 | 10/2008 | Marvin |
| 7,447,793 B2 | 11/2008 | Morioka |
| 7,448,022 B1 | 11/2008 | Ram et al. |
| 7,454,399 B2 | 11/2008 | Matichuk |
| 7,461,062 B2 | 12/2008 | Stewart et al. |
| 7,467,384 B2 | 12/2008 | Brubacher et al. |
| 7,472,349 B1 | 12/2008 | Srivastava et al. |
| 7,478,416 B2 | 1/2009 | Edson |
| 7,519,076 B2 | 4/2009 | Janssen et al. |
| 7,580,994 B1 | 8/2009 | Fiszman et al. |
| 7,590,696 B1 | 9/2009 | Odell et al. |
| 7,617,521 B2 | 11/2009 | Maes |
| 7,630,953 B2 | 12/2009 | Stauber et al. |
| 7,644,145 B2 | 1/2010 | Rockwell |
| 7,660,297 B2 | 2/2010 | Fisher et al. |
| 7,676,813 B2 | 3/2010 | Bisset et al. |
| 7,702,792 B2 | 4/2010 | Shaffer et al. |
| 7,716,310 B2 | 5/2010 | Foti |
| 7,720,926 B2 | 5/2010 | Asahara |
| 7,730,129 B2 | 6/2010 | Wang et al. |
| 7,752,634 B1 | 7/2010 | Saxena et al. |
| 7,779,445 B2 | 8/2010 | Ellis |
| 7,853,647 B2 | 12/2010 | Maes |
| 7,860,490 B2 | 12/2010 | Maes |
| 7,865,607 B2 | 1/2011 | Sonalkar et al. |
| 7,873,716 B2 | 1/2011 | Maes |
| 7,904,909 B1 | 3/2011 | Reiner et al. |
| 7,925,727 B2 | 4/2011 | Sullivan et al. |
| 7,933,397 B2 | 4/2011 | Jain |
| 8,023,971 B2 | 9/2011 | Egli |
| 8,027,921 B1 | 9/2011 | Boydstun et al. |
| 8,032,920 B2 | 10/2011 | Maes |
| 8,036,362 B1 | 10/2011 | Skinner |
| 8,060,067 B2 | 11/2011 | Tarleton et al. |
| 8,068,860 B1 | 11/2011 | Midkiff |
| 8,073,810 B2 | 12/2011 | Maes |
| 8,086,665 B1 | 12/2011 | Soukup et al. |
| 8,090,848 B2 | 1/2012 | Maes |
| 8,114,555 B2 | 2/2012 | Leonida et al. |
| 8,121,278 B2 | 2/2012 | Leigh et al. |
| 8,161,171 B2 | 4/2012 | Maes |
| 8,214,503 B2 | 7/2012 | Maes |
| 8,223,951 B1 | 7/2012 | Edelhaus et al. |
| 8,230,449 B2 | 7/2012 | Maes |
| 8,255,470 B2 | 8/2012 | Jackson et al. |
| 8,321,498 B2 | 11/2012 | Maes |
| 8,321,594 B2 | 11/2012 | Maes et al. |
| 8,335,862 B2 | 12/2012 | Fletcher et al. |
| 8,370,506 B2 | 2/2013 | Maes |
| 8,386,609 B2 | 2/2013 | Anand et al. |
| 8,401,009 B1 | 3/2013 | Dorsey et al. |
| 8,401,022 B2 | 3/2013 | Maes et al. |
| 8,458,703 B2 | 6/2013 | Maes |
| 8,478,311 B2 | 7/2013 | Sennett et al. |
| 8,505,067 B2 | 8/2013 | Maes |
| 8,533,773 B2 | 9/2013 | Maes |
| 8,539,097 B2 | 9/2013 | Maes |
| 8,543,665 B2 | 9/2013 | Ansari et al. |
| 8,589,338 B2 | 11/2013 | Maes |
| 8,675,852 B2 | 3/2014 | Maes |
| 8,676,155 B2 | 3/2014 | Fan et al. |
| 8,744,055 B2 | 6/2014 | Maes |
| 8,849,685 B2 | 9/2014 | Oden |
| 8,879,547 B2 | 11/2014 | Maes |
| 8,914,493 B2 | 12/2014 | Maes |
| 8,918,493 B1 | 12/2014 | Beach et al. |
| 8,966,498 B2 | 2/2015 | Maes |
| 9,038,082 B2 | 5/2015 | Maes |
| 9,083,599 B2 | 7/2015 | Huuhtanen et al. |
| 9,088,570 B2 | 7/2015 | Anderson et al. |
| 9,245,236 B2 | 1/2016 | Maes |
| 9,269,060 B2 | 2/2016 | Maes |
| 2001/0010053 A1 | 7/2001 | Ben-Shachar et al. |
| 2001/0016880 A1 | 8/2001 | Cai et al. |
| 2001/0028649 A1 | 10/2001 | Pogossiants et al. |
| 2002/0002684 A1 | 1/2002 | Fox et al. |
| 2002/0004827 A1 | 1/2002 | Ciscon et al. |
| 2002/0075844 A1 | 6/2002 | Hagen |
| 2002/0087674 A1 | 7/2002 | Guilford et al. |
| 2002/0099738 A1 | 7/2002 | Grant |
| 2002/0101879 A1 | 8/2002 | Bouret |
| 2002/0104015 A1 | 8/2002 | Barzilai et al. |
| 2002/0111848 A1 | 8/2002 | White |
| 2002/0120697 A1 | 8/2002 | Generous et al. |
| 2002/0120729 A1 | 8/2002 | Faccin et al. |
| 2002/0143819 A1 | 10/2002 | Han et al. |
| 2002/0144119 A1 | 10/2002 | Benatar |
| 2002/0178122 A1 | 11/2002 | Maes |

(56) References Cited

U.S. PATENT DOCUMENTS

| | | |
|---|---|---|
| 2002/0184373 A1 | 12/2002 | Maes |
| 2002/0191774 A1 | 12/2002 | Creamer et al. |
| 2002/0194388 A1 | 12/2002 | Boloker et al. |
| 2002/0198719 A1 | 12/2002 | Gergic et al. |
| 2002/0198991 A1 | 12/2002 | Gopalakrishnan et al. |
| 2003/0003953 A1 | 1/2003 | Houplain |
| 2003/0004746 A1 | 1/2003 | Kheirolomoom et al. |
| 2003/0005034 A1 | 1/2003 | Amin |
| 2003/0023953 A1 | 1/2003 | Lucassen et al. |
| 2003/0046316 A1 | 3/2003 | Gergic et al. |
| 2003/0061268 A1 | 3/2003 | Moerdijk et al. |
| 2003/0061404 A1 | 3/2003 | Atwal et al. |
| 2003/0115203 A1 | 6/2003 | Brown et al. |
| 2003/0115260 A1 | 6/2003 | Edge |
| 2003/0118167 A1 | 6/2003 | Sammon et al. |
| 2003/0120502 A1 | 6/2003 | Robb et al. |
| 2003/0131069 A1* | 7/2003 | Lucovsky ............ G06F 21/335 709/217 |
| 2003/0131076 A1 | 7/2003 | Nelson et al. |
| 2003/0135553 A1 | 7/2003 | Pendakur |
| 2003/0140115 A1 | 7/2003 | Mehra |
| 2003/0140131 A1 | 7/2003 | Chandrashekhar et al. |
| 2003/0154233 A1 | 8/2003 | Patterson |
| 2003/0182550 A1 | 9/2003 | Chen et al. |
| 2003/0185233 A1 | 10/2003 | Ji et al. |
| 2003/0191769 A1 | 10/2003 | Crisan et al. |
| 2003/0191823 A1 | 10/2003 | Bansal et al. |
| 2003/0208539 A1 | 11/2003 | Gildenblat et al. |
| 2003/0217044 A1 | 11/2003 | Zhang et al. |
| 2003/0229760 A1 | 12/2003 | Doyle et al. |
| 2003/0229812 A1 | 12/2003 | Buchholz |
| 2004/0015547 A1 | 1/2004 | Griffin et al. |
| 2004/0015578 A1 | 1/2004 | Karakashian et al. |
| 2004/0019695 A1 | 1/2004 | Fellenstein et al. |
| 2004/0024720 A1 | 2/2004 | Fairweather |
| 2004/0044647 A1* | 3/2004 | Salmenkaita ..................... 707/1 |
| 2004/0054718 A1 | 3/2004 | Hicks, III et al. |
| 2004/0064528 A1 | 4/2004 | Meredith et al. |
| 2004/0068586 A1 | 4/2004 | Xie et al. |
| 2004/0093381 A1 | 5/2004 | Hodges et al. |
| 2004/0093593 A1 | 5/2004 | Jhanwar et al. |
| 2004/0100923 A1 | 5/2004 | Yam |
| 2004/0110493 A1 | 6/2004 | Alvarez et al. |
| 2004/0125758 A1 | 7/2004 | Hayduk |
| 2004/0128546 A1 | 7/2004 | Blakley et al. |
| 2004/0133627 A1 | 7/2004 | Kalyanaraman et al. |
| 2004/0139319 A1 | 7/2004 | Favazza et al. |
| 2004/0148334 A1 | 7/2004 | Arellano et al. |
| 2004/0153545 A1 | 8/2004 | Pandaya et al. |
| 2004/0161090 A1 | 8/2004 | Digate et al. |
| 2004/0162881 A1* | 8/2004 | Digate et al. ................. 709/206 |
| 2004/0176988 A1 | 9/2004 | Boughannam |
| 2004/0221005 A1 | 11/2004 | Albaugh et al. |
| 2005/0004974 A1 | 1/2005 | Sharma et al. |
| 2005/0015340 A1 | 1/2005 | Maes |
| 2005/0021670 A1 | 1/2005 | Maes |
| 2005/0050194 A1 | 3/2005 | Honeisen et al. |
| 2005/0054287 A1 | 3/2005 | Kim |
| 2005/0068167 A1* | 3/2005 | Boyer et al. .................. 340/531 |
| 2005/0073982 A1 | 4/2005 | Corneille et al. |
| 2005/0075115 A1 | 4/2005 | Corneille et al. |
| 2005/0086197 A1 | 4/2005 | Boubez et al. |
| 2005/0086297 A1 | 4/2005 | Hinks |
| 2005/0091156 A1 | 4/2005 | Hailwood et al. |
| 2005/0114533 A1 | 5/2005 | Hullfish et al. |
| 2005/0125696 A1 | 6/2005 | Afshar et al. |
| 2005/0132086 A1 | 6/2005 | Flurry et al. |
| 2005/0141691 A1 | 6/2005 | Wengrovitz |
| 2005/0144557 A1 | 6/2005 | Li et al. |
| 2005/0172027 A1 | 8/2005 | Castellanos et al. |
| 2005/0193269 A1 | 9/2005 | Haswell et al. |
| 2005/0204391 A1 | 9/2005 | Hunleth et al. |
| 2005/0228984 A1 | 10/2005 | Edery et al. |
| 2005/0239485 A1 | 10/2005 | Kundu et al. |
| 2005/0249190 A1 | 11/2005 | Birch |
| 2005/0249344 A1 | 11/2005 | Mueller et al. |
| 2005/0267979 A1 | 12/2005 | Bailey |
| 2006/0014688 A1 | 1/2006 | Costa et al. |
| 2006/0021010 A1 | 1/2006 | Atkins et al. |
| 2006/0031441 A1 | 2/2006 | Davis et al. |
| 2006/0031559 A1 | 2/2006 | Sorokopud et al. |
| 2006/0036689 A1 | 2/2006 | Buford et al. |
| 2006/0041669 A1 | 2/2006 | Bemmel et al. |
| 2006/0047753 A1 | 3/2006 | Pal |
| 2006/0048159 A1 | 3/2006 | Yazawa et al. |
| 2006/0053227 A1 | 3/2006 | Ye et al. |
| 2006/0072474 A1 | 4/2006 | Mitchell |
| 2006/0080117 A1 | 4/2006 | Carr et al. |
| 2006/0104306 A1 | 5/2006 | Adamczyk et al. |
| 2006/0104431 A1 | 5/2006 | Emery et al. |
| 2006/0112400 A1 | 5/2006 | Zhang et al. |
| 2006/0116912 A1 | 6/2006 | Maes |
| 2006/0117109 A1 | 6/2006 | Maes |
| 2006/0117376 A1 | 6/2006 | Maes |
| 2006/0136560 A1 | 6/2006 | Jiang |
| 2006/0143622 A1 | 6/2006 | Prabandham et al. |
| 2006/0143686 A1 | 6/2006 | Maes |
| 2006/0146792 A1 | 7/2006 | Ramachandran et al. |
| 2006/0164902 A1 | 7/2006 | Fung |
| 2006/0165060 A1 | 7/2006 | Dua |
| 2006/0178898 A1 | 8/2006 | Habibi |
| 2006/0190600 A1 | 8/2006 | Blohm et al. |
| 2006/0205393 A1 | 9/2006 | Veen |
| 2006/0210033 A1 | 9/2006 | Grech et al. |
| 2006/0212574 A1 | 9/2006 | Maes |
| 2006/0229078 A1 | 10/2006 | Itzkovitz et al. |
| 2006/0256774 A1 | 11/2006 | Rigaldies et al. |
| 2006/0272028 A1 | 11/2006 | Maes |
| 2006/0282856 A1 | 12/2006 | Errico et al. |
| 2006/0291507 A1 | 12/2006 | Sarosi et al. |
| 2007/0005770 A1 | 1/2007 | Kramer et al. |
| 2007/0011191 A1 | 1/2007 | Otokawa et al. |
| 2007/0011322 A1 | 1/2007 | Moiso |
| 2007/0027975 A1 | 2/2007 | Tai et al. |
| 2007/0047534 A1 | 3/2007 | Hakusui |
| 2007/0061397 A1 | 3/2007 | Gregorat et al. |
| 2007/0071224 A1 | 3/2007 | Shtivelman et al. |
| 2007/0088836 A1 | 4/2007 | Tai et al. |
| 2007/0099613 A1 | 5/2007 | Burgan et al. |
| 2007/0100831 A1 | 5/2007 | Cox |
| 2007/0100981 A1 | 5/2007 | Adamczyk et al. |
| 2007/0112574 A1 | 5/2007 | Greene |
| 2007/0117556 A1 | 5/2007 | Rogalski |
| 2007/0118618 A1 | 5/2007 | Kisel et al. |
| 2007/0118648 A1 | 5/2007 | Millefiorini et al. |
| 2007/0118662 A1 | 5/2007 | Vishwanathan et al. |
| 2007/0121539 A1 | 5/2007 | Kikuchi |
| 2007/0123297 A1 | 5/2007 | Chan et al. |
| 2007/0150480 A1 | 6/2007 | Hwang et al. |
| 2007/0150936 A1 | 6/2007 | Maes |
| 2007/0173226 A1 | 7/2007 | Cai et al. |
| 2007/0182541 A1 | 8/2007 | Harris et al. |
| 2007/0189466 A1 | 8/2007 | Croak et al. |
| 2007/0192374 A1 | 8/2007 | Abnous et al. |
| 2007/0192465 A1 | 8/2007 | Modarressi |
| 2007/0197227 A1 | 8/2007 | Naqvi et al. |
| 2007/0198982 A1 | 8/2007 | Bolan et al. |
| 2007/0201376 A1 | 8/2007 | Marshall-Wilson |
| 2007/0203841 A1 | 8/2007 | Maes |
| 2007/0204017 A1 | 8/2007 | Maes |
| 2007/0223462 A1 | 9/2007 | Hite et al. |
| 2007/0223671 A1 | 9/2007 | Lee |
| 2007/0233883 A1 | 10/2007 | De Lutiis et al. |
| 2007/0239866 A1 | 10/2007 | Cox et al. |
| 2007/0255662 A1 | 11/2007 | Tumminaro |
| 2007/0271554 A1 | 11/2007 | Fletcher et al. |
| 2007/0276907 A1 | 11/2007 | Maes |
| 2007/0280226 A1 | 12/2007 | Sonalkar et al. |
| 2007/0291859 A1 | 12/2007 | Maes |
| 2008/0013533 A1 | 1/2008 | Bogineni et al. |
| 2008/0025243 A1 | 1/2008 | Corneille et al. |
| 2008/0037747 A1 | 2/2008 | Tucker |
| 2008/0043975 A1 | 2/2008 | Miloslavsky et al. |
| 2008/0049929 A1 | 2/2008 | Miloslavsky et al. |

(56) References Cited

U.S. PATENT DOCUMENTS

| | | |
|---|---|---|
| 2008/0080479 A1 | 4/2008 | Maes |
| 2008/0085712 A1 | 4/2008 | Han |
| 2008/0095326 A1 | 4/2008 | Qi et al. |
| 2008/0109853 A1 | 5/2008 | Einarsson et al. |
| 2008/0126541 A1 | 5/2008 | Rosenberg et al. |
| 2008/0127232 A1 | 5/2008 | Langen et al. |
| 2008/0147799 A1* | 6/2008 | Morris .......................... 709/206 |
| 2008/0151768 A1 | 6/2008 | Liu |
| 2008/0151918 A1 | 6/2008 | Foti |
| 2008/0162637 A1 | 7/2008 | Adamczyk et al. |
| 2008/0163235 A1 | 7/2008 | Marvin et al. |
| 2008/0168523 A1 | 7/2008 | Ansari et al. |
| 2008/0171549 A1 | 7/2008 | Hursey et al. |
| 2008/0172482 A1 | 7/2008 | Shah |
| 2008/0175251 A1 | 7/2008 | Oouchi et al. |
| 2008/0175357 A1 | 7/2008 | Tucker |
| 2008/0186845 A1 | 8/2008 | Maes |
| 2008/0189401 A1 | 8/2008 | Maes |
| 2008/0201705 A1 | 8/2008 | Wookey |
| 2008/0201715 A1 | 8/2008 | Breiter et al. |
| 2008/0212762 A1 | 9/2008 | Gray et al. |
| 2008/0222694 A1 | 9/2008 | Nakae |
| 2008/0228919 A1 | 9/2008 | Doshi et al. |
| 2008/0232567 A1 | 9/2008 | Maes |
| 2008/0235230 A1 | 9/2008 | Maes |
| 2008/0235327 A1 | 9/2008 | Maes et al. |
| 2008/0235354 A1 | 9/2008 | Maes |
| 2008/0235380 A1 | 9/2008 | Maes |
| 2008/0253543 A1 | 10/2008 | Aharon |
| 2008/0271039 A1 | 10/2008 | Rolia et al. |
| 2008/0275883 A1 | 11/2008 | Ashraf et al. |
| 2008/0281607 A1 | 11/2008 | Sajja et al. |
| 2008/0288966 A1 | 11/2008 | Maes |
| 2008/0292074 A1 | 11/2008 | Boni et al. |
| 2008/0293389 A1 | 11/2008 | Chin et al. |
| 2008/0301135 A1 | 12/2008 | Alves et al. |
| 2008/0307108 A1 | 12/2008 | Yan et al. |
| 2008/0313648 A1 | 12/2008 | Wang et al. |
| 2009/0003362 A1 | 1/2009 | Pattabhiraman et al. |
| 2009/0006360 A1 | 1/2009 | Liao et al. |
| 2009/0015433 A1 | 1/2009 | James et al. |
| 2009/0022072 A1 | 1/2009 | Zhu et al. |
| 2009/0022286 A1 | 1/2009 | Brunson et al. |
| 2009/0034426 A1 | 2/2009 | Luft et al. |
| 2009/0086950 A1 | 4/2009 | Vendrow et al. |
| 2009/0093240 A1 | 4/2009 | Lang |
| 2009/0106677 A1 | 4/2009 | Son et al. |
| 2009/0109959 A1 | 4/2009 | Elliott et al. |
| 2009/0112875 A1 | 4/2009 | Maes |
| 2009/0119303 A1 | 5/2009 | Rio et al. |
| 2009/0119672 A1 | 5/2009 | Bussard et al. |
| 2009/0125595 A1 | 5/2009 | Maes |
| 2009/0132220 A1 | 5/2009 | Chakraborty et al. |
| 2009/0132717 A1 | 5/2009 | Maes |
| 2009/0154681 A1 | 6/2009 | Kung et al. |
| 2009/0180440 A1 | 7/2009 | Sengupta et al. |
| 2009/0185576 A1 | 7/2009 | Kisel et al. |
| 2009/0187919 A1 | 7/2009 | Maes |
| 2009/0190603 A1 | 7/2009 | Damola et al. |
| 2009/0192992 A1 | 7/2009 | Arthursson |
| 2009/0193057 A1 | 7/2009 | Maes |
| 2009/0193433 A1 | 7/2009 | Maes |
| 2009/0201917 A1 | 8/2009 | Maes et al. |
| 2009/0222541 A1 | 9/2009 | Monga et al. |
| 2009/0222836 A1 | 9/2009 | Paval |
| 2009/0222858 A1 | 9/2009 | Hjelm et al. |
| 2009/0228584 A1 | 9/2009 | Maes et al. |
| 2009/0253434 A1 | 10/2009 | Hayashi et al. |
| 2009/0306834 A1 | 12/2009 | Hjelm et al. |
| 2009/0328051 A1 | 12/2009 | Maes |
| 2010/0037157 A1 | 2/2010 | Chang et al. |
| 2010/0049640 A1 | 2/2010 | Maes |
| 2010/0049826 A1 | 2/2010 | Maes |
| 2010/0058436 A1 | 3/2010 | Maes |
| 2010/0070447 A1 | 3/2010 | Pfuntner et al. |
| 2010/0077082 A1 | 3/2010 | Hession et al. |
| 2010/0083285 A1 | 4/2010 | Bahat et al. |
| 2010/0091764 A1 | 4/2010 | Merino Gonzalez et al. |
| 2010/0128696 A1 | 5/2010 | Fantini et al. |
| 2010/0153865 A1 | 6/2010 | Barnes et al. |
| 2010/0179995 A1 | 7/2010 | Wang |
| 2010/0185772 A1 | 7/2010 | Wang et al. |
| 2010/0192004 A1 | 7/2010 | Bauchot et al. |
| 2010/0235844 A1 | 9/2010 | Arwe et al. |
| 2010/0281488 A1 | 11/2010 | Krishnamurthy et al. |
| 2011/0035443 A1* | 2/2011 | Jensen .......................... 709/204 |
| 2011/0125909 A1 | 5/2011 | Maes |
| 2011/0125913 A1 | 5/2011 | Maes |
| 2011/0126261 A1 | 5/2011 | Maes |
| 2011/0134804 A1 | 6/2011 | Maes |
| 2011/0134843 A1 | 6/2011 | Noldus et al. |
| 2011/0142211 A1 | 6/2011 | Maes |
| 2011/0145278 A1 | 6/2011 | Maes |
| 2011/0182205 A1 | 7/2011 | Gerdes et al. |
| 2011/0258619 A1 | 10/2011 | Wookey |
| 2011/0280383 A1 | 11/2011 | Varga et al. |
| 2012/0045040 A1 | 2/2012 | Maes |
| 2012/0047506 A1 | 2/2012 | Maes |
| 2012/0106728 A1 | 5/2012 | Ghaffari et al. |
| 2012/0173745 A1 | 7/2012 | Maes |

FOREIGN PATENT DOCUMENTS

| | | |
|---|---|---|
| WO | 2008111027 | 12/2008 |
| WO | 2008146097 | 12/2008 |

OTHER PUBLICATIONS

Day et al., "RFC 2778, A Model for Presence and Instant Messaging", published on Feb. 2000.*

U.S. Appl. No. 11/848,347, filed Aug. 31, 2007, Notice of Allowance mailed Mar. 2, 2012, 9 pages.

U.S. Appl. No. 11/951,500, filed Dec. 6, 2007, Office Action mailed Apr. 11, 2012, 6 pages.

U.S. Appl. No. 11/070,317, filed Mar. 1, 2005, Office Action dated Mar. 15, 2012, 10 pages.

U.S. Appl. No. 11/939,705, filed Nov. 14, 2007, Final Office Action mailed Mar. 15, 2012, 16 pages.

U.S. Appl. No. 12/045,220, filed Mar. 10, 2008, Final Office Action dated Mar. 15, 2012, 20 pages.

U.S. Appl. No. 12/019,335, filed Jan. 24, 2008, Advisory Action mailed Feb. 27, 2012, 3 pages.

U.S. Appl. No. 12/544,484, filed Aug. 20, 2009, Advisory Action dated Feb. 9, 2012, 2 pages.

U.S. Appl. No. 11/949,930, filed Dec. 4, 2007, Notice of Allowance mailed Mar. 19, 2012, 19 pages.

U.S. Appl. No. 12/014,387, filed Jan. 15, 2008, Final Office Action mailed Apr. 5, 2012, 17 pages.

U.S. Appl. No. 12/018,718, filed Jan. 23, 2008, Final Office Action mailed Feb. 1, 2012, 30 pages.

U.S. Appl. No. 12/019,299, filed Jan. 24, 2008, Advisory Action mailed Nov. 3, 2011, 2 pages.

U.S. Appl. No. 12/019,299, filed Jan. 24, 2008, Office Action mailed Feb. 16, 2012, 18 pages.

Author Unknown, "Assuring Quality of Experience for IPTV—White Paper," Heavy Reading, Jul. 2006, 18 pages.

Author Unknown, "LTE Mobile Transport Evolution—Strategic White Paper," Alcatel Lucent, accessed Jan. 10, 2012 from http://lte.alcatel-lucent.com/locale/en_us/downloads/Alcatel-Lucent_LTE_Transport_WhitePaper.pdf, 2011, 16 pages.

Andrews, Tony et al., Business Process Execution Language for Web Services, Version 1.1, BEA Systems, International Business Machines Corporation, SAP AG, Siebel Systems, May 5, 2003, 31 pages.

Burger, E. et al., "Deploying CCXML for Application-Layer Call Control," Aug. 2006, 11 pages.

Dhesikan, "Quality of Service for IP Videoconferencing—Engineering White Paper," Cisco Systems, Jun. 1, 2001, 16 pages.

(56) References Cited

OTHER PUBLICATIONS

International Search Report and Written Opinion of PCT/US2010/037074 mailed Jun. 1, 2011, 16 pages.
Kim et al., "Implementation of Third Party Based Call Control using Parlay Network API in SIP Environment," ICOIN 2003, LNCS 2662, 2003, pp. 416-425.
Liberty Architecture Overview, Liberty Alliance Project Version 1.1, Piscataway New Jersey, Jan. 15, 2003, 44 pages.
Maes, Stephane, Multi-modal Browser Architecture, Overview on the support of multi-modal browsers in 3GPP, IBM Research Mobile Speech Solutions and Conversational Multi-modal Computing, http://www.w3.org, accessed May 26, 2003, 25 pages.
Maes, Stephane, Multi-modal Web IBM Position W3C/WAP Workshop, IBM Research Human Language Technologies, http://www.w3.org, accessed May 26, 2003, 9 pages.
Maretzke, Michael, "JAIN SLEE Technology Overview," <http://www.maretzke.de/pub/lectures/jslee_overview_2005/JSLEE_Overview_2005.pdf>, Apr. 12, 2005, 26 pages.
O'Doherty, Phelim, "JSLEE—SIP Servlet," <http://java.sun.com/products/jain/JSLEE-SIPServlet.pdf, 2003, 13 pages.
Parlay APIs 4.0, Parlay X Web Services White Paper, The Parlay Group, Parlay X Working Group, Dec. 16, 2002, 12 pages.
Policy-Based Management Tom Sheldon's Linktionary, http://www.linktionary.com/policy.html, accessed Aug. 2, 2004, 4 pages.
Romellini, C. et al., "CCXML: The Power of Standardization," Loquendo, Sep. 27, 2005, 7 pages.
Seely, Scott, "XML and Web Services Security: Understanding WS-Security," Microsoft Corporation, 2002, 11 pages.
Simpson et al., Java Product Review—Oracle EDA Suite, Dec. 4, 2006, Open Source Magazine, pp. 1-10.
Single Sign on Deployment Guide, Introduction to Single-Sign-On, Netscape 6 Documentation Training Manual http://developer.netscape.com/docs/manuals/security/SSO/sso.htm, accessed May 26, 2003, 5 pages.
Sundsted, Todd E., With Liberty and single sign-on for all, The Liberty Alliance Project seeks to solve the current online identity crisis Java World, downloaded www.javaworld.com/javaworld/jw-02-2002/jw-0215-liberty.html, accessed May 26, 2003, 7 pages.
The Parlay Group, "Specifications," <http://web.archive.org/web/20050114014707/www.parlay.org/specs/index.asp>, Jan. 14, 2005, 2 pages.
Thomas, Ann M., "Registering a Web Service in UDDI," SOA World Magazine, Sep. 26, 2003, 9 pages.
U.S. Appl. No. 11/848,347, filed Aug. 31, 2007, Advisory Action mailed Jul. 27, 2010, 3 pages.
U.S. Appl. No. 11/848,347, filed Aug. 31, 2007, Final Office Action mailed May 10, 2010, 15 pages.
U.S. Appl. No. 11/848,347, filed Aug. 31, 2007, Office Action mailed Oct. 29, 2009, 12 pages.
U.S. Appl. No. 11/848,347, filed Aug. 31, 2007, Office Action mailed Sep. 30, 2010, 19 pages.
U.S. Appl. No. 11/848,347, filed Aug. 31, 2007, Final Office Action mailed Mar. 7, 2011, 21 pages.
U.S. Appl. No. 11/848,347, filed Aug. 31, 2007, Advisory Action mailed May 23, 2011, 3 pages.
U.S. Appl. No. 11/877,129, filed Oct. 23, 2007, Advisory Action mailed Jun. 3, 2010, 2 pages.
U.S. Appl. No. 11/877,129, filed Oct. 23, 2007, Final Office Action mailed Mar. 29, 2010, 17 pages.
U.S. Appl. No. 11/877,129, filed Oct. 23, 2007, Notice of Allowance mailed Aug. 5, 2010, 6 pages.
U.S. Appl. No. 11/877,129, filed Oct. 23, 2007, Office Action mailed Sep. 28, 2009, 15 pages.
U.S. Appl. No. 11/926,738, filed Oct. 29, 2007, Final Office Action mailed Jun. 29, 2010, 12 pages.
U.S. Appl. No. 11/926,738, filed Oct. 29, 2007, Office Action mailed Feb. 24, 2010, 12 pages.
U.S. Appl. No. 11/926,738, filed Oct. 29, 2007, Advisory Action mailed Sep. 3, 2010, 2 pages.
U.S. Appl. No. 11/926,738, filed Oct. 29, 2007, Office Action mailed Nov. 10, 2010, 12 pages.
U.S. Appl. No. 11/926,738, filed Oct. 29, 2007, Final Office Action mailed Mar. 17, 2011, 13 pages.
U.S. Appl. No. 11/926,738, filed Oct. 29, 2007, Advisory Action mailed May 25, 2011, 3 pages.
U.S. Appl. No. 11/926,738, filed Oct. 29, 2007, Notice of Allowance mailed Aug. 5, 2011, 13 pages.
U.S. Appl. No. 11/943,101, filed Nov. 20, 2007, Advisory Action mailed Apr. 16, 2010, 3 pages.
U.S. Appl. No. 11/943,101, filed Nov. 20, 2007, Final Office Action mailed Feb. 2, 2010, 9 pages.
U.S. Appl. No. 11/943,101, filed Nov. 20, 2007, Office Action mailed Jul. 8, 2009, 11 pages.
U.S. Appl. No. 11/943,101, filed Nov. 20, 2007, Office Action mailed Aug. 27, 2010, 11 pages.
U.S. Appl. No. 11/943,101, filed Nov. 20, 2007, Final Office Action mailed Feb. 14, 2011, 11 pages.
U.S. Appl. No. 11/943,101, filed Nov. 20, 2007, Advisory Action mailed Apr. 28, 2011, 3 pages.
U.S. Appl. No. 11/943,101, filed Nov. 20, 2007, Office Action mailed Jul. 28, 2011, 11 pages.
U.S. Appl. No. 11/943,101, filed Nov. 20, 2007, Notice of Allowance mailed Dec. 9, 2011, 7 pages.
U.S. Appl. No. 11/951,500, filed Dec. 6, 2007, Advisory Action mailed Jun. 24, 2010, 2 pages.
U.S. Appl. No. 11/951,500, filed Dec. 6, 2007, Final Office Action mailed Mar. 30, 2010, 26 pages.
U.S. Appl. No. 11/951,500, filed Dec. 6, 2007, Office Action mailed Sep. 22, 2009, 24 pages.
U.S. Appl. No. 11/951,500, filed Dec. 6, 2007, Office Action mailed Sep. 1, 2010, 30 pages.
U.S. Appl. No. 11/951,500, filed Dec. 6, 2007, Final Office Action mailed Apr. 14, 2011, 33 pages.
U.S. Appl. No. 11/951,500, filed Dec. 6, 2007, Advisory Action mailed Jul. 15, 2011, 3 pages.
U.S. Appl. No. 10/855,999, filed May 28, 2004, Advisory Action dated Feb. 16, 2010, 3 pages.
U.S. Appl. No. 10/855,999, filed May 28, 2004, Advisory Action dated Feb. 2, 2009, 3 pages.
U.S. Appl. No. 10/855,999, filed May 28, 2004, Final Office Action dated Nov. 19, 2008, 12 pages.
U.S. Appl. No. 10/855,999, filed May 28, 2004, Final Office Action dated Nov. 23, 2009, 19 pages.
U.S. Appl. No. 10/855,999, filed May 28, 2004, Office Action dated Apr. 15, 2009, 13 pages.
U.S. Appl. No. 10/855,999, filed May 28, 2004, Office Action dated May 1, 2008, 9 pages.
U.S. Appl. No. 10/855,999, filed May 28, 2004, Office Action dated Jun. 24, 2010, 20 pages.
U.S. Appl. No. 10/855,999, filed May 28, 2004, Final Office Action dated Jan. 5, 2011, 19 pages.
U.S. Appl. No. 10/855,999, filed May 28, 2004, Advisory Action dated Mar. 18, 2011, 3 pages.
U.S. Appl. No. 10/856,588, filed May 28, 2004, Advisory Action dated Jan. 5, 2010, 3 pages.
U.S. Appl. No. 10/856,588, filed May 28, 2004, Final Office Action dated Oct. 15, 2008, 11 pages.
U.S. Appl. No. 10/856,588, filed May 28, 2004, Final Office Action dated Oct. 20, 2009, 17 pages.
U.S. Appl. No. 10/856,588, filed May 28, 2004, Notice of Allowance dated Sep. 23, 2010, 8 pages.
U.S. Appl. No. 10/856,588, filed May 28, 2004, Office Action dated Mar. 16, 2009, 10 pages.
U.S. Appl. No. 10/856,588, filed May 28, 2004, Office Action dated Apr. 11, 2008, 16 pages.
U.S. Appl. No. 11/070,317, filed Mar. 1, 2005, Advisory Action dated May 19, 2009, 3 pages.
U.S. Appl. No. 11/070,317, filed Mar. 1, 2005, Final Office Action dated Feb. 2, 2010, 8 pages.
U.S. Appl. No. 11/070,317, filed Mar. 1, 2005, Final Office Action dated Mar. 4, 2009, 16 pages.

(56) References Cited

OTHER PUBLICATIONS

U.S. Appl. No. 11/070,317, filed Mar. 1, 2005, Final Office Action dated Sep. 27, 2010, 8 pages.
U.S. Appl. No. 11/070,317, filed Mar. 1, 2005, Office Action dated Apr. 30, 2010, 9 pages.
U.S. Appl. No. 11/070,317, filed Mar. 1, 2005, Office Action dated Aug. 18, 2009, 21 pages.
U.S. Appl. No. 11/070,317, filed Mar. 1, 2005 Office Action dated Aug. 5, 2008, 18 pages.
U.S. Appl. No. 11/024,160, filed Dec. 27, 2004, Office Action dated Feb. 7, 2011, 11 pages.
U.S. Appl. No. 11/024,160, filed Dec. 27, 2004, Advisory Action dated Feb. 18, 2010, 3 pages.
U.S. Appl. No. 11/024,160, filed Dec. 27, 2004, Final Office Action dated Oct. 15, 2010, 11 pages.
U.S. Appl. No. 11/024,160, filed Dec. 27, 2004, Final Office Action dated Dec. 3, 2009, 11 pages.
U.S. Appl. No. 11/024,160, filed Dec. 27, 2004, Final Office Action dated Feb. 11, 2009, 9 pages.
U.S. Appl. No. 11/024,160, filed Dec. 27, 2004, Office Action dated Jun. 29, 2009, 9 pages.
U.S. Appl. No. 11/024,160, filed Dec. 27, 2004, Office Action dated Jun. 9, 2010, 10 pages.
U.S. Appl. No. 11/024,160, filed Dec. 27, 2004, Office Action dated Aug. 22, 2008, 8 pages.
U.S. Appl. No. 11/024,160, filed Dec. 27, 2004, Final Office Action dated Jun. 1, 2011, 11 pages.
U.S. Appl. No. 11/024,160, filed Dec. 27, 2004, Notice of Allowance dated Aug. 4, 2011, 15 pages.
U.S. Appl. No. 11/123,468, filed May 5, 2005, Advisory Action dated Feb. 17, 2010, 3 pages.
U.S. Appl. No. 11/123,468, filed May 5, 2005, Final Office Action dated Nov. 10, 2010, 18 pages.
U.S. Appl. No. 11/123,468, filed May 5, 2005, Final Office Action dated Nov. 24, 2009, 19 pages.
U.S. Appl. No. 11/123,468, filed May 5, 2005, Office Action dated Apr. 10, 2009, 17 pages.
U.S. Appl. No. 11/123,468, filed May 5, 2005, Office Action dated Apr. 14, 2010, 16 pages.
U.S. Appl. No. 11/123,468, filed May 5, 2005, Advisory Action dated Jan. 18, 2011, 2 pages.
U.S. Appl. No. 11/123,471, filed May 5, 2005, Notice of Allowance dated Jun. 29, 2009, 6 pages.
U.S. Appl. No. 11/123,471, filed May 5, 2005, Office Action dated Jan. 23, 2009, 8 pages.
U.S. Appl. No. 11/130,636, filed May 16, 2005, Notice of Allowance mailed Aug. 18, 2010, 4 pages.
U.S. Appl. No. 11/130,636, filed May 16, 2005, Office Action dated Mar. 23, 2010, 6 pages.
U.S. Appl. No. 11/130,636, filed May 16, 2005, Office Action dated Sep. 18, 2009, 13 pages.
U.S. Appl. No. 11/939,705, filed Nov. 14, 2007, Office Action mailed Oct. 4, 2010, 21 pages.
U.S. Appl. No. 11/939,705, filed Nov. 14, 2007, Final Office Action mailed Mar. 16, 2011, 21 pages.
U.S. Appl. No. 11/939,705, filed Nov. 14, 2007, Office Action mailed Sep. 28, 2011, 15 pages.
U.S. Appl. No. 12/045,220, filed Mar. 10, 2008, Advisory Action dated Jun. 11, 2010, 3 pages.
U.S. Appl. No. 12/045,220, filed Mar. 10, 2008, Final Office Action dated Apr. 2, 2010, 19 pages.
U.S. Appl. No. 12/045,220, filed Mar. 10, 2008, Office Action dated Oct. 2, 2009, 18 pages.
U.S. Appl. No. 12/045,220, filed Mar. 10, 2008, Office Action dated Sep. 27, 2011, 20 pages.
U.S. Appl. No. 12/019,335, filed Jan. 24, 2008, Office Action mailed May 23, 2011, 18 pages.
U.S. Appl. No. 12/019,335, filed Jan. 24, 2008, Final Office Action mailed Dec. 5, 2011, 19 pages.
U.S. Appl. No. 12/364,642, filed Feb. 3, 2009, Office Action dated Dec. 20, 2010, 18 pages.
U.S. Appl. No. 12/364,642, filed Feb. 3, 2009, Final Office Action dated Jul. 1, 2011, 20 pages.
U.S. Appl. No. 12/364,642, filed Feb. 3, 2009, Advisory Action dated Sep. 16, 2011, 3 pages.
U.S. Appl. No. 12/364,642, filed Feb. 3, 2009, Office Action dated Oct. 18, 2011, 21 pages.
U.S. Appl. No. 11/357,653, filed Feb. 16, 2006, Office Action dated Jan. 20, 2011, 18 pages.
U.S. Appl. No. 11/357,653, filed Feb. 16, 2006, Final Office Action dated Aug. 2, 2011, 19 pages.
U.S. Appl. No. 11/357,653, filed Feb. 16, 2006, Advisory Action dated Oct. 12, 2011, 3 pages.
U.S. Appl. No. 12/544,459, filed Aug. 20, 2009, Office Action mailed Mar. 2, 2011, 10 pages.
U.S. Appl. No. 12/544,459, filed Aug. 20, 2009, Notice of Allowance mailed Aug. 22, 2011, 8 pages.
U.S. Appl. No. 12/544,471, filed Aug. 20, 2009, Office Action dated Jan. 6, 2012, 8 pages.
U.S. Appl. No. 12/544,484, filed Aug. 20, 2009, Office Action dated Jun. 3, 2011, 6 pages.
U.S. Appl. No. 12/544,484, filed Aug. 20, 2009, Final Office Action dated Dec. 1, 2011, 8 pages.
U.S. Appl. No. 11/949,930, filed Dec. 4, 2007, Office Action mailed Sep. 29, 2011, 19 pages.
U.S. Appl. No. 11/969,343, filed Jan. 4, 2008, Office Action mailed Jun. 10, 2011, 13 pages.
U.S. Appl. No. 11/969,343, filed Jan. 4, 2008, Final Office Action mailed Oct. 21, 2011, 11 pages.
U.S. Appl. No. 11/969,343, filed Jan. 4, 2008, Advisory Action mailed Jan. 5, 2012, 3 pages.
U.S. Appl. No. 12/014,387, filed Jan. 15, 2008, Office Action mailed Sep. 7, 2011, 18 pages.
U.S. Appl. No. 12/018,718, filed Jan. 23, 2008, Office Action mailed Jun. 22, 2011, 23 pages.
U.S. Appl. No. 12/019,299, filed Jan. 24, 2008, Advisory Action dated Dec. 9, 2010, 3 pages.
U.S. Appl. No. 12/019,299, filed Jan. 24, 2008, Final Office Action mailed Oct. 6, 2010, 20 pages.
U.S. Appl. No. 12/019,299, filed Jan. 24, 2008, Office Action mailed Mar. 31, 2010, 13 pages.
U.S. Appl. No. 12/019,299, filed Jan. 24, 2008, Office Action mailed Jan. 24, 2011, 16 pages.
U.S. Appl. No. 12/019,299, filed Jan. 24, 2008, Final Office Action mailed Aug. 25, 2011, 20 pages.
Wikipedia, "Parlay," <http://web.archive.org/web/20050130172632/en.wikipedia.org/wiki/Parlay>, Jan. 30, 2005, 3 pages.
Wikipedia, "Object-Oriented Programming," <http://web.archive.org/web/20051211141918/http://en.wikipedia.org/wiki/Object-oriented_programming>, Dec. 11, 2005, 10 pages.
Wikipedia, "OSI model," <http://web.archive.org/web/20050907132012/http://en.wikipedia.org/wiki/Osi_model>, Sep. 7, 2005, 8 pages.
U.S. Appl. No. 11/939,705, filed Nov. 14, 2007, Advisory Action mailed Jun. 1, 2012, 9 pages.
U.S. Appl. No. 11/939,705, filed Nov. 14, 2007, Office Action mailed Jul. 6, 2012, 13 pages.
U.S. Appl. No. 12/045,220, filed Mar. 10, 2008, Advisory Action dated May 31, 2012, 3 pages.
U.S. Appl. No. 12/364,642, filed Feb. 3, 2009, Final Office Action dated Jun. 19, 2012, 24 pages.
U.S. Appl. No. 11/357,653, filed Feb. 16, 2006, Office Action dated Apr. 26, 2012, 18 pages.
U.S. Appl. No. 12/490,540, filed Jun. 24, 2009, Office Action dated Jul. 6, 2012, 16 pages.
U.S. Appl. No. 12/014,387, filed Jan. 15, 2008, Advisory Action mailed Jun. 15, 2012, 3 pages.
U.S. Appl. No. 12/948,247, filed Nov. 17, 2010, Office Action mailed Jul. 6, 2012, 14 pages.
U.S. Appl. No. 12/791,129, filed Jun. 1, 2010, Office Action mailed Jul. 10, 2012, 14 pages.

(56) References Cited

OTHER PUBLICATIONS

U.S. Appl. No. 13/416,413, filed Mar. 9, 2012, Office Action mailed Apr. 27, 2012, 11 pages.
U.S. Appl. No. 11/951,500, filed Dec. 6, 2007, Notice of Allowance mailed Jul. 23, 2012, 7 pages.
U.S. Appl. No. 11/070,317, filed Mar. 1, 2005, Notice of Allowance dated Sep. 4, 2012, 8 pages.
U.S. Appl. No. 12/364,642, filed Feb. 3, 2009, Advisory Action dated Sep. 14, 2012, 3 pages.
U.S. Appl. No. 11/357,653, filed Feb. 16, 2006, Final Office Action dated Sep. 21, 2012, 21 pages.
U.S. Appl. No. 12/544,471, filed Aug. 20, 2009, Final Office Action dated Jul. 30, 2012, 26 pages.
U.S. Appl. No. 12/019,299, filed Jan. 24, 2008, Final Office Action mailed Aug. 15, 2012, 19 pages.
U.S. Appl. No. 13/416,413, filed Mar. 9, 2012, Notice of Allowance mailed Oct. 2, 2012, 5 pages.
U.S. Appl. No. 10/855,999, filed May 28, 2004, Non-Final Office Action dated Mar. 28, 2013, 42 pages.
U.S. Appl. No. 10/855,999, filed May 28, 2004, Advisory Action dated Mar. 18, 2011, 5 pages.
U.S. Appl. No. 11/070,317, filed Mar. 1, 2005, Notice of Allowance dated Oct. 19, 2012, 11 pages.
U.S. Appl. No. 11/939,705, filed Nov. 14, 2007, Final Office Action mailed Dec. 5, 2012, 18 pages.
U.S. Appl. No. 12/364,642, filed Feb. 3, 2009, Notice of Allowance dated Nov. 14, 2012, 8 pages.
U.S. Appl. No. 11/357,653, filed Feb. 16, 2006, Advisory Action dated Dec. 4, 2012, 3 pages.
U.S. Appl. No. 12/544,471, filed Aug. 20, 2009, Advisory Action dated Nov. 9, 2012, 3 pages.
U.S. Appl. No. 12/544,471, filed Aug. 20, 2009, Notice of Allowance dated Mar. 12, 2013, 78 pages.
U.S. Appl. No. 12/490,540, filed Jun. 24, 2009, Notice of Allowance dated Feb. 4, 2013, 43 pages.
U.S. Appl. No. 12/019,299, filed Jan. 24, 2008, Advisory Action mailed Oct. 29, 2012, 3 pages.
U.S. Appl. No. 12/019,299, filed Jan. 24, 2008, Non Final Office Action mailed Dec. 7, 2012, 21 pages.
U.S. Appl. No. 12/948,247, filed Nov. 17, 2010, Final Office Action mailed Feb. 11, 2013, 25 pages.
U.S. Appl. No. 12/791,129, filed Jun. 1, 2010, Final Office Action mailed Dec. 7, 2012, 9 pages.
U.S. Appl. No. 12/948,450, filed Nov. 17, 2010, Non-Final Office Action mailed Nov. 7, 2012, 13 pages.
U.S. Appl. No. 12/949,183, filed Nov. 18, 2010, Non-final Office Action mailed Nov. 16, 2012, 29 pages.
U.S. Appl. No. 13/029,219, filed Feb. 17, 2011, Non-Final Office Action mailed Mar. 20, 2013, 12 pages.
U.S. Appl. No. 11/939,705, filed Nov. 14, 2007, Notice of Allowance mailed May 15, 2013, 92 pages.
U.S. Appl. No. 12/018,718, filed Jan. 23, 2008, Non-Final Office Action mailed Apr. 24, 2013, 114 pages.
U.S. Appl. No. 12/948,450, filed Nov. 17, 2010, Notice of Allowance mailed May 10, 2013, 28 pages.
U.S. Appl. No. 12/949,183, filed Nov. 18, 2010, Final Office Action mailed Apr. 17, 2013, 30 pages.
U.S. Appl. No. 12/949,287, filed Nov. 18, 2010, Final Office Action mailed Apr. 23, 2013, 28 pages.
U.S. Appl. No. 13/029,226, filed Feb. 17, 2011, Non-Final Office Action mailed May 28, 2013, 47 pages.
U.S. Appl. No. 10/855,999, filed May 28, 2004, Final Office Action dated Nov. 18, 2013, 14 pages.
U.S. Appl. No. 12/045,220, filed Mar. 10, 2008, Non-Final Office Action dated Oct. 7, 2013, 19 pages.
U.S. Appl. No. 11/357,653, filed Feb. 16, 2006, Non-final Office Action dated Jul. 11, 2013, 26 pages.
U.S. Appl. No. 11/357,653, filed Feb. 16, 2006, Final Office Action dated Nov. 26, 2013, 25 pages.
U.S. Appl. No. 12/014,387, filed Jan. 15, 2008, Notice of Allowance mailed Oct. 25, 2013, 17 pages.
U.S. Appl. No. 12/018,718, filed Jan. 23, 2008, Final Office Action mailed Sep. 10, 2013, 55 pages.
U.S. Appl. No. 12/018,718, filed Jan. 23, 2008, Advisory Action mailed Nov. 15, 2013, 3 pages.
U.S. Appl. No. 12/791,129, filed Jun. 1, 2010, Non-Final Office Action mailed Sep. 11, 2013, 10 pages.
U.S. Appl. No. 12/949,183, filed Nov. 18, 2010, Advisory Action mailed Jun. 28, 2013, 3 pages.
U.S. Appl. No. 12/949,183, filed Nov. 18, 2010, Non-Final Office Action mailed Sep. 9, 2013, 18 pages.
U.S. Appl. No. 12/949,287, filed Nov. 18, 2010, Non-final Office Action mailed Aug. 8, 2013, 24 pages.
U.S. Appl. No. 12/949,287, filed Nov. 18, 2010, Final Office Action mailed Nov. 25, 2013, 25 pages.
U.S. Appl. No. 12/957,697, filed Dec. 1, 2010 Non-Final Office Action mailed Oct. 1, 2013, 10 pages.
U.S. Appl. No. 13/029,219, filed Feb. 17, 2011, Final Office Action mailed Oct. 11, 2013, 22 pages.
U.S. Appl. No. 12/019,335, filed Jan. 24, 2008, Final Office Action mailed Jan. 14, 2014, 33 pages.
U.S. Appl. No. 11/969,343, filed Jan. 4, 2008, Notice of Allowance mailed Jan. 16, 2014, 6 pages.
U.S. Appl. No. 12/791,129, filed Jun. 1, 2010, Final Office Action mailed Dec. 20, 2013, 10 pages.
U.S. Appl. No. 13/029,219, filed Feb. 17, 2011, Advisory Action mailed Jan. 2, 2014, 3 pages.
U.S. Appl. No. 11/357,653, Final Office Action mailed on Aug. 18, 2014, 15 pages.
U.S. Appl. No. 12/018,718, Non-Final Office Action mailed on Sep. 30, 2014, 50 pages.
U.S. Appl. No. 12/045,220, Notice of Allowance mailed on Aug. 13, 2014, 5 pages.
U.S. Appl. No. 12/544,484, Non-Final Office Action mailed on Aug. 1, 2014, 14 pages.
U.S. Appl. No. 12/791,129, Corrected Notice of Allowability mailed on Oct. 6, 2014, 6 pages.
U.S. Appl. No. 12/949,183, Non-Final Office Action mailed on Sep. 22, 2014, 16 pages.
U.S. Appl. No. 12/949,287, Non-Final Office Action mailed on Sep. 8, 2014, 27 pages.
U.S. Appl. No. 13/029,219, Final Office Action mailed on Sep. 12, 2014, 24 pages.
U.S. Appl. No. 12/948,247, Final Office Action mailed on Nov. 25, 2014, 20 pages.
U.S. Appl. No. 12/957,697, Final Office Action mailed on Nov. 26, 2014, 11 pages.
U.S. Appl. No. 11/123,468, Non-Final Office Action mailed on Jun. 10, 2014, 18 pages.
U.S. Appl. No. 12/019,335, Notice of Allowance mailed on Jun. 11, 2014, 7 pages.
U.S. Appl. No. 12/957,697, Non-Final Office Action mailed on Jul. 2, 2014, 9 pages.
U.S. Appl. No. 11/357,653, Non Final Office Action mailed on Mar. 27, 2014, 19 pages.
U.S. Appl. No. 11/969,343, Notice of Allowance mailed on Apr. 9, 2014, 6 pages.
U.S. Appl. No. 12/014,387, Corrective Notice of Allowance mailed on Dec. 18, 2013, 4 pages.
U.S. Appl. No. 12/019,299, Notice of Allowance mailed on Jul. 3, 2013, 6 pages.
U.S. Appl. No. 12/019,335, Non Final Office Action mailed on Jul. 26, 2013, 19 pages.
U.S. Appl. No. 12/045,220, Final Office Action mailed on Apr. 18, 2014, 20 pages.
U.S. Appl. No. 12/544,484, Non Final Office Action mailed on May 8, 2014, 13 pages.
U.S. Appl. No. 12/791,129, Advisory Action mailed on Mar. 6, 2014, 3 pages.
U.S. Appl. No. 12/791,129, Notice of Allowance mailed on Apr. 24, 2014, 9 pages.

(56) References Cited

OTHER PUBLICATIONS

U.S. Appl. No. 12/949,183, Final Office Action mailed on Jan. 21, 2014, 16 pages.
U.S. Appl. No. 12/949,183, Advisory Action mailed on Apr. 10, 2014, 3 pages.
U.S. Appl. No. 12/949,287, Non Final Office Action mailed on Nov. 19, 2012, 32 pages.
U.S. Appl. No. 12/957,697, Final Office Action mailed on Mar. 20, 2014, 15 pages.
U.S. Appl. No. 13/029,219, Non Final Office Action mailed on Apr. 11, 2014, 23 pages.
U.S. Appl. No. 13/029,226, Final Office Action mailed on Jan. 30, 2014, 12 pages.
U.S. Appl. No. 13/029,226, Advisory Action mailed on Apr. 7, 2014, 3 pages.
U.S. Appl. No. 12/948,247, Non-Final Office Action mailed on May 21, 2014, 18 pages.
U.S. Appl. No. 13/029,226, Non-Final Office Action mailed on May 22, 2014, 12 pages.
U.S. Appl. No. 12/957,697, Advisory Action mailed on May 29, 2014, 2 pages.
Maffioletti et al., Automatic resource and service management for ubiquitous computing environments, Pervasive Computing and Communications Workshops, Proceedings of the Second IEEE Annual Conference on IEEE, 2004.
Simon et al., A simple query interface for interoperable learning repositories, Proceedings of the 1st Workshop on Interoperability of Web-based Educational Systems, 2005, pp. 11-18.
U.S. Appl. No. 11/123,468, Non-Final Office Action mailed on Jan. 30, 2015, 19 pages.
U.S. Appl. No. 12/544,484, Final Office Action mailed on Dec. 26, 2014, 12 pages.
U.S. Appl. No. 12/949,183, Final Office Action mailed on Jan. 22, 2015, 16 pages.
U.S. Appl. No. 12/949,287, Final Office Action mailed on Dec. 23, 2014, 27 pages.
U.S. Appl. No. 12/957,697, Advisory Action mailed on Feb. 3, 2015, 3 pages.
U.S. Appl. No. 13/029,219, Notice of Allowance mailed on Jan. 22, 2015, 12 pages.
U.S. Appl. No. 13/029,226, Final Office Action mailed on Jan. 8, 2015, 13 pages.
U.S. Appl. No. 12/544,484, Advisory Action mailed on Mar. 10, 2015, 3 pages.
U.S. Appl. No. 12/948,247, Advisory Action mailed on Mar. 6, 2015, 3 pages.
U.S. Appl. No. 12/949,183, Advisory Action mailed on Mar. 26, 2015, 3 pages.
U.S. Appl. No. 12/949,287, Advisory Action mailed on Mar. 10, 2015, 3 pages.
U.S. Appl. No. 12/957,697, Non-Final Office Action mailed on Mar. 6, 2015, 11 pages.
U.S. Appl. No. 13/029,226, Advisory Action mailed on Mar. 25, 2015, 2 pages.
U.S. Appl. No. 11/357,653, Notice of Allowance mailed on Oct. 5, 2015, 16 pages.
U.S. Appl. No. 11/357,653, Notice of Allowance mailed on Sep. 11, 2015, 19 pages.
U.S. Appl. No. 12/948,247, Notice of Allowance mailed on Oct. 13, 2015, 8 pages.
U.S. Appl. No. 12/949,183, Non-Final Office Action mailed on Sep. 16, 2015, 15 pages.
U.S. Appl. No. 12/949,287, Non-Final Office Action mailed on Sep. 18, 2015, 29 pages.
U.S. Appl. No. 12/957,697, Advisory Action mailed on Aug. 25, 2015, 2 pages.
U.S. Appl. No. 12/957,697, Non-Final Office Action mailed on Oct. 15, 2015, 13 pages.
U.S. Appl. No. 11/123,468, filed May 5, 2005, Final Office Action dated Apr. 8, 2016, all pages.
U.S. Appl. No. 12/949,287, filed Nov. 18, 2010, Final Office Action mailed Feb. 19, 2016, all pages.
U.S. Appl. No. 10/855,999, Non-Final Office Action mailed on Jun. 17, 2015, 16 pages.
U.S. Appl. No. 12/018,718, Final Office Action mailed on Jun. 30, 2015, 22 pages.
U.S. Appl. No. 12/957,697, Final Office Action mailed on Jun. 18, 2015, 12 pages.
U.S. Appl. No. 13/029,226, Non-Final Office Action mailed on Jun. 19, 2015, 13 pages.
U.S. Appl. No. 13/029,226, filed Feb. 17, 2011, Final Office Action mailed Jan. 4, 2016, all pages.
U.S. Appl. No. 12/018,718, filed Jan. 23, 2008, Non-Final Office Action mailed Jan. 6, 2016, all pages.
U.S. Appl. No. 12/957,697, filed Dec. 10, 2010, Final Office Action mailed Feb. 3, 2016, all pages.
U.S. Appl. No. 12/949,183, filed Nov. 18, 2010, Final Office Action mailed Feb. 8, 2016, all pages.
U.S. Appl. No. 12/018,718, Final Office Action, mailed on Aug. 25, 2016, 29 pages.

* cited by examiner

GLOBAL PRESENCE

The present application claims benefit under 35 USC 119(e) of U.S. Provisional Application No. 61/286,976, filed on Dec. 16, 2009 by Maes et al. and entitled "Global Presence," of which the entire disclosure is incorporated herein by reference for all purposes.

BACKGROUND OF THE INVENTION

Embodiments of the present invention relate generally to methods and systems for providing presence information for a principal and more particularly to providing presence information for a principal without a presence or other user agent.

Today various multimedia networks allow users, through user agents on various devices, to publish their presence information. Presence is defined here, and conventionally defined, as a transient state of a principal that can be used by other entities to make a decision about how to best communicate with the principal. A principal can be defined as an entity that has an identity, that is capable of providing consent and other data, and to which authenticated actions are done on its behalf. Presence information for a principal can be obtained by another entity using a subscribe/publish model wherein a principal publishes its presence to a presence server which in turn notifies authorized subscribers of the information or change of information. Additionally or alternatively, presence information can be obtained by interrogating or querying the presence server.

However, current approaches to providing and/or obtaining presence information for a principal require participation in an IM or multimedia messaging network or a presence network (or set of presence networks) with a presence server/enabler or presence aggregation. Further, devices participating in such networks need to include appropriate user agents or applications playing the role of user agents, i.e., a Presence Network Agent (PNA). These current approaches do not address or provide an ability to query presence information without being part of the presence network or without the appropriate application or presence agent. Hence, there is a need for improved methods and systems for providing presence information for a principal.

BRIEF SUMMARY OF THE INVENTION

Embodiments of the invention provide systems and methods for providing presence information for a principal without a presence or other user agent. According to one embodiment, a method of providing presence information for a principal can comprise receiving presence information related to a first entity from a device without a presence agent for the presence system at a presence information service and providing the presence information related to the first entity from the presence information service to a second entity which may or may not have a presence agent.

In one implementation, a set of presence information for one or more principals can be maintained with the presence information service, e.g., in a database or other repository. The set of presence information can include at least the presence information related to the first entity. Maintaining the set of presence information can comprise, for example, updating the set of presence information based on the received presence information related to the first entity and one or more policies. Providing the presence information related to the first entity to the second entity device can comprise providing a notification of a change in the presence information for the first entity. Additionally or alternatively, a request for the presence information related to the first entity can be received by the presence information service. In such a case, providing the presence information related to the first entity to the second entity can be performed in response to the request. Providing the presence information related to the first entity to the second entity, either in the form of a notification of in response to a request, can be based on one or more policies, e.g., for authentication, authorization, etc.

In another implementation, maintaining the set of presence information can comprise providing the presence information from the presence information service to a presence server of a presence network. For example, the set of presence information can be maintained by the presence server, e.g., in a database or other repository. The presence information service can provide the presence information related to the first entity to the presence server. The presence server can in turn update the set of presence information based on the presence information related to the first entity and one or more policies. Providing the presence information related to the first entity to the second entity can then comprise providing the presence information related to the first entity from the presence server to the second entity via the presence information service.

In yet another implementation, the presence information related to the first entity can be received and maintained at a presence server of a presence network. A set of presence information can be maintained for one or more principals with the presence server, e.g., in a database or other repository. The set of presence information can include including at least the presence information related to the first entity. The set of presence information can be updated with the presence server based on the presence information related to the first entity and one or more policies. The presence information related to the first entity can be provided from the presence server to the presence information service, e.g., periodically, in response to a request, or based on some other occurrence, condition, etc.

In any of the various implementations, receiving presence information related to the first entity can comprise receiving the presence information related to the first entity according to a constrained schema or as unconstrained data. The presence information related to the first entity, either constrained or unconstrained, can be received in one or more of a Short Message Service (SMS) message, a Multimedia Message Service (MMS) message, an email message, an Instant Message (IM), a forum post, a blog post, a document upload, or other communication. Similarly, providing the presence information related to the first entity to the second entity can comprise providing one or more of a Rich Site Summary (RSS) feed, an email message, a Short Message Service (SMS) message, a Multimedia Message Service (MMS) message, an Instant Message (IM), or a web page. For example, providing the presence information related to the first entity to the second entity device can comprise providing the presence information related to the first entity via a web service.

According to another embodiment, a system can comprise a first entity device without a presence agent, a second entity device, and a presence information service. The presence information service can be adapted to receive presence information related to a first entity from the first entity device and provide the presence information related to the first entity to the second entity device. For example, the presence information service can be implemented as a web service.

In one implementation, the presence information service can be adapted to maintain, for example in a database or other repository, a set of presence information for one or more principals including at least the presence information related to the first entity. Maintaining the set of presence information can comprise updating the set of presence information based on the received presence information related to the first entity and one or more policies. Providing the presence information related to the first entity to the second entity device can comprise providing a notification of a change in the presence information for the first entity. Additionally or alternatively, the presence information service is further adapted to receive a request for the presence information related to the first entity from the second entity device. In such a case, the presence information service can be adapted to provide the presence information related to the first entity to the second entity device in response to the request. Providing the presence information related to the first entity to the second entity, either in the form of a notification of in response to a request, can be based on one or more policies, e.g., for authentication, authorization, etc.

In another implementation, the system can further comprise a presence server of a presence network. In such a case, the presence information service can maintain the set of presence information by providing the presence information from the presence information service to the presence server. For example, maintaining the set of presence information can comprise maintaining the set of presence information with the presence server, e.g., in a database or other repository, wherein the presence information service provides the presence information related to the first entity to the presence server, and wherein the presence server updates the set of presence information based on the presence information related to the first entity and one or more policies. Further, the presence server can provide the presence information related to the first entity to the presence information service, e.g., periodically, in response to a request, or based on some other occurrence, condition, etc. The presence information service can in turn provide the presence information related to the first entity to the second entity device.

In yet another implementation, the system can comprise a presence server of a presence network which can receive the presence information related to the first entity from the first entity device and maintain a set of presence information for one or more principals including at least the presence information related to the first entity. For example, the presence server can be adapted to update the set of presence information based on the presence information related to the first entity and one or more policies. The presence server can be adapted to provide the presence information related to the first entity to the presence information service, which in turn can provide the presence information related to the first entity to the second entity.

In any of the implementations, receiving presence information related to the first entity can comprise receiving the presence information related to the first entity according to a constrained schema or as unconstrained data. The presence information related to the first entity, either constrained or unconstrained, can be received in one or more of a Short Message Service (SMS) message, a Multimedia Message Service (MMS) message, an email message, an Instant Message (IM), a forum post, a blog post, a document upload, or other communication. Similarly, providing the presence information related to the first entity to the second entity can comprise providing one or more of a Rich Site Summary (RSS) feed, an email message, a Short Message Service (SMS) message, a Multimedia Message Service (MMS) message, an Instant Message (IM), or a web page.

DETAILED DESCRIPTION OF THE INVENTION

Figure 1:
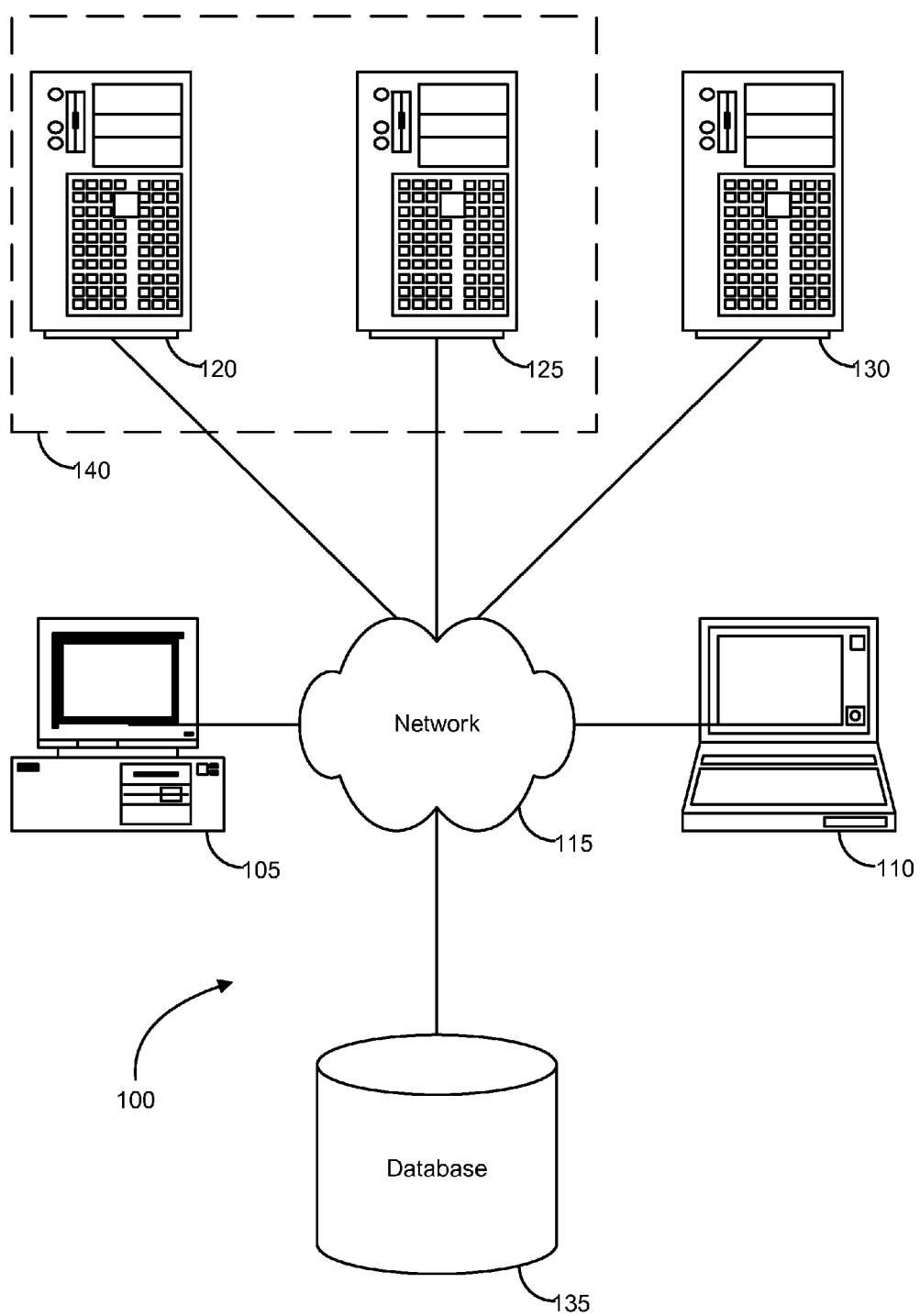
FIG. 1 is a block diagram illustrating components of an exemplary operating environment in which various embodiments of the present invention may be implemented.

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Embodiments of the invention provide systems and methods for providing presence information for a principal without a presence or other user agent. More specifically, embodiments of the present invention provide for publication of presence information independent of a presence agent or other user agent, presence network, or presence server as well as subsequent ways for authorized presence watchers to subscribe to presence and receive notification or query presence information for a principal. Stated another way providing presence information for a principal can comprise receiving presence information related to a first entity from a device without a presence agent at a presence information service and providing the presence information related to the first entity from the presence information service to a second entity.

Presence is defined here, and conventionally defined, as a transient state of a principal that can be used by other entities to make a decision about how to best communicate with the principal. A principal can be defined as an entity that has an identity, that is capable of providing consent and other data, and to which authenticated actions are done on its behalf. Therefore, a principal may be a computing device but it may also be a person across multiple computing devices or even an organization, a service, or a group of persons. Presence information for a principal can be obtained by an entity using a subscribe/publish model wherein a principal publishes its presence to a presence information service which in turn notifies authorized subscribers of the information or change of information. Additionally or alternatively, presence information can be obtained by interrogating or querying the service. As noted above, embodiments of the present invention allow the principal to publish presence information without use of a presence or other user agent and the presence information service need not be implemented on a presence server or presence network. Rather, the presence information service can be implemented, for example, as a web service accessible via any of a number of different means and in fact the converse can be to get presence details without a presence agent.

Embodiments of the present invention allow a user to publish presence information as "presence attributes" according to a constrained schema or in a Binary Large Object, Basic large object (BLOB) or unconstrained set of data. For example, messages can be sent or posts can be made from a publishing principal to a presence information service. For example, these messages can include but are not limited to a Short Message Service (SMS) message, a Multimedia Message Service (MMS) message, an email message, an Instant Message (IM), a forum post, a blog post, a document upload, or other communication to the presence information service via any one or more of a variety of possible communication channels. Similarly, providing the presence information related to the principal to another entity, either as a notification or in response to a query, can comprise providing one or more of a variety of different messages including but not limited to a Rich Site Summary (RSS) feed, an email message, a Short Message Service (SMS) message, a Multimedia Message Service (MMS) message, an Instant Message (IM), or a web page via any one or more of a variety of possible communication channels.

One or more policies or sets of polices can be applied when presence information is published by the principal and/or when the presence information for the principal is provided to another entity, either as a notification or in response to a query. That is, one or more policies can be maintained and applied by the presence information service or other system(s) when receiving and/or providing the presence information. Such policies can be used, for example, to perform authentication and/or authorization, to determine who can access the presence information, what presence information can be distributed, how it can or should be transformed before being distributed, etc.

Systems for providing presence information for a principal as described herein can be implemented in a number of different ways without departing from the scope of the present invention. In one implementation, for example, no presence server or presence network is used. In such a case, the system includes a presence information service, such as a web service (e.g., SOAP or REST or a web form to fill), that can receive publication of presence information for the principal, maintain the presence information, for example in a database or other repository, and provide the presence information to other entities, for example as a blob or web page. In another exemplary implementation, a presence server of presence network can be used by the presence information service to maintain the presence information for the principal. In this example, the presence information service receives the presence information from the principal and then publishes that information to the presence server. The presence information service can then provide the presence information from the presence server to another entity, either as a notification or in response to a query. In yet another example, a presence server of presence network can be used to maintain the presence information for the principal wherein the presence server receives publication of the presence information from the principal. The presence information service can then provide the presence information from the presence server to another entity, either as a notification or in response to a query. Each of these different implementations and various additional details of these and other embodiments of the present invention will be described below with reference to the figures.

FIG. 1 is a block diagram illustrating components of an exemplary operating environment in which various embodiments of the present invention may be implemented. The system 100 can include one or more user computers 105, 110, which may be used to operate a client, whether a dedicate application, web browser, etc. The user computers 105, 110 can be general purpose personal computers (including, merely by way of example, personal computers and/or laptop computers running various versions of Microsoft Corp.'s Windows and/or Apple Corp.'s Macintosh operating systems) and/or workstation computers running any of a variety of commercially-available UNIX or UNIX-like operating systems (including without limitation, the variety of GNU/Linux operating systems). These user computers 105, 110 may also have any of a variety of applications, including one or more development systems, database client and/or server applications, and web browser applications. Alternatively, the user computers 105, 110 may be any other electronic device, such as a thin-client computer, Internet-enabled mobile telephone, and/or personal digital assistant, capable of communicating via a network (e.g., the network 115 described below) and/or displaying and navigating web pages or other types of electronic documents. Although the exemplary system 100 is shown with two user computers, any number of user computers may be supported.

In some embodiments, the system 100 may also include a network 115. The network may can be any type of network familiar to those skilled in the art that can support data communications using any of a variety of commercially-available protocols, including without limitation TCP/IP, SNA, IPX, AppleTalk, and the like. Merely by way of example, the network 115 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks such as GSM, GPRS, EDGE, UMTS, 3G, 2.5 G, CDMA, CDMA2000, WCDMA, EVDO etc.

The system may also include one or more server computers 120, 125, 130 which can be general purpose computers and/or specialized server computers (including, merely by way of example, PC servers, UNIX servers, mid-range servers, mainframe computers rack-mounted servers, etc.). One or more of the servers (e.g., 130) may be dedicated to running applications, such as a business application, a web server, application server, etc. Such servers may be used to process requests from user computers 105, 110. The applications can also include any number of applications for controlling access to resources of the servers 120, 125, 130.

The web server can be running an operating system including any of those discussed above, as well as any commercially-available server operating systems. The web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 105, 110. As one example, a server may execute one or more web applications. The web application may be implemented as one or more scripts or programs written in any programming language, such as Java™, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 105, 110.

In some embodiments, an application server may create web pages dynamically for displaying on an end-user (client) system. The web pages created by the web application server may be forwarded to a user computer 105 via a web server. Similarly, the web server can receive web page requests and/or input data from a user computer and can forward the web page requests and/or input data to an application and/or a database server. Those skilled in the art will recognize that the functions described with respect to various types of servers may be performed by a single server and/or a plurality of specialized servers, depending on implementation-specific needs and parameters.

The system 100 may also include one or more databases 135. The database(s) 135 may reside in a variety of locations. By way of example, a database 135 may reside on a storage medium local to (and/or resident in) one or more of the computers 105, 110, 115, 125, 130. Alternatively, it may be remote from any or all of the computers 105, 110, 115, 125, 130, and/or in communication (e.g., via the network 120) with one or more of these. In a particular set of embodiments, the database 135 may reside in a storage-area network ("SAN") familiar to those skilled in the art. Similarly, any necessary files for performing the functions attributed to the computers 105, 110, 115, 125, 130 may be stored locally on the respective computer and/or remotely, as appropriate. In one set of embodiments, the database 135 may be a relational database, such as Oracle 10g, that is adapted to store, update, and retrieve data in response to SQL-formatted commands.

Figure 2:
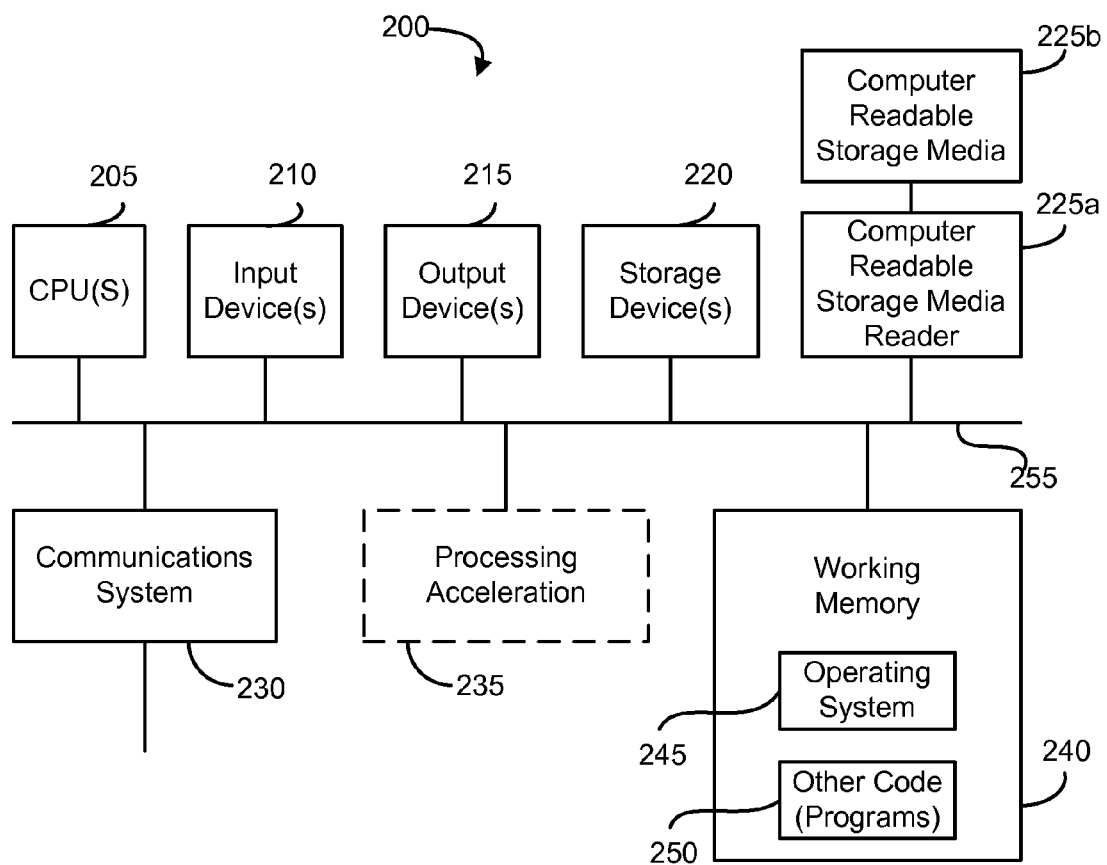
FIG. 2 is a block diagram illustrating an exemplary computer system in which embodiments of the present invention may be implemented.

FIG. 2 illustrates an exemplary computer system 200, in which various embodiments of the present invention may be implemented. The system 200 may be used to implement any of the computer systems described above. The computer system 200 is shown comprising hardware elements that may be electrically coupled via a bus 255. The hardware elements may include one or more central processing units (CPUs) 205, one or more input devices 210 (e.g., a mouse, a keyboard, etc.), and one or more output devices 215 (e.g., a display device, a printer, etc.). The computer system 200 may also include one or more storage device 220. By way of example, storage device(s) 220 may be disk drives, optical storage devices, solid-state storage device such as a random access memory ("RAM") and/or a read-only memory ("ROM"), which can be programmable, flash-updateable and/or the like.

The computer system 200 may additionally include a computer-readable storage media reader 225a, a communications system 230 (e.g., a modem, a network card (wireless or wired), an infra-red communication device, etc.), and working memory 240, which may include RAM and ROM devices as described above. In some embodiments, the computer system 200 may also include a processing acceleration unit 235, which can include a DSP, a special-purpose processor and/or the like.

The computer-readable storage media reader 225a can further be connected to a computer-readable storage medium 225b, together (and, optionally, in combination with storage device(s) 220) comprehensively representing remote, local, fixed, and/or removable storage devices plus storage media for temporarily and/or more permanently containing computer-readable information. The communications system 230 may permit data to be exchanged with the network 220 and/or any other computer described above with respect to the system 200.

The computer system 200 may also comprise software elements, shown as being currently located within a working memory 240, including an operating system 245 and/or other code 250, such as an application program (which may be a client application, web browser, mid-tier application, RDBMS, etc.). It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed. Software of computer system 200 may include code 250 for implementing embodiments of the present invention as described herein.

Figure 3:
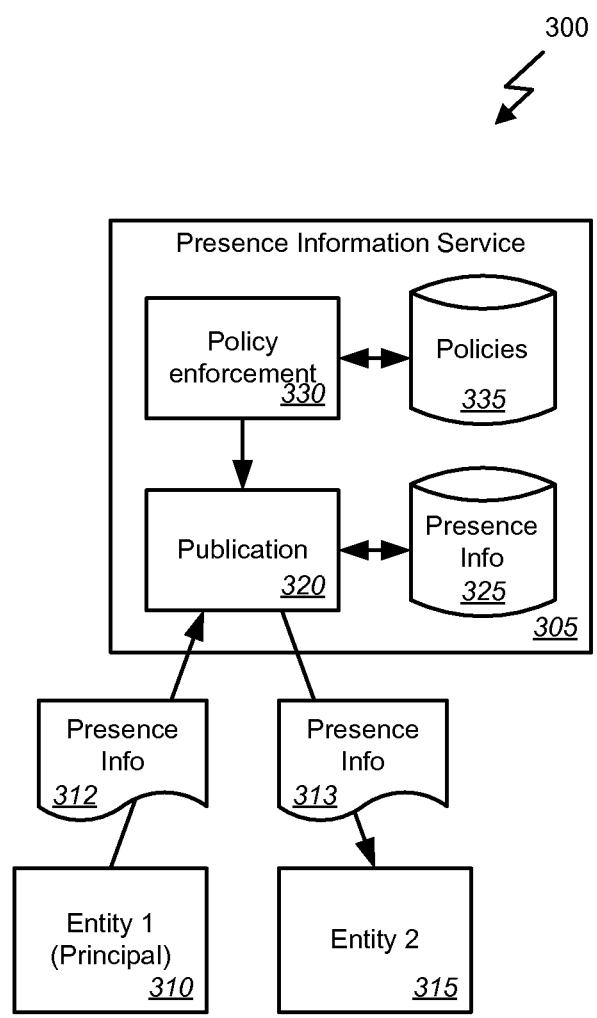
FIG. 3 is a block diagram illustrating, at a high-level, functional components of a system for providing global presence information according to one embodiment of the present invention.

FIG. 3 is a block diagram illustrating, at a high-level, functional components of a system for providing global presence information according to one embodiment of the present invention. In this example, the system 300 includes a presence information service 305, a device of a first entity 310, i.e., the principal, communicatively coupled with the presence information service 305 and a device of a second entity 315 also communicatively coupled with the presence information service 305. The device of the first entity 310 and the device of the second entity 315 can be communicatively coupled with the presence service via the Internet or any other local or wide area wired or wireless network as described above.

It should be noted that the device of the first entity 310 and the device of the second entity 315 need not include a presence agent or other user agent. Furthermore, in this system 300, no presence server or presence network is used. Rather, the presence information service 305, which can be implemented as a web service for example, can receive, for example via publication module 320, publication of presence information 312 for the principal, i.e., from the device of the first entity 310, maintain the presence information 325, for example in a database or other repository, and provide the presence information 313 to the device of the second entity 315, for example as a blob or web page via publication module 320.

Receiving presence information 312 related to the first entity 310 can comprise receiving the presence information 312 related to the first entity according to a constrained schema or as unconstrained data. The presence information 312 related to the first entity, either constrained or unconstrained, can be received in one or more of a Short Message Service (SMS) message, a Multimedia Message Service (MMS) message, an email message, an Instant Message (IM), a forum post, a blog post, a document upload, or other communication. Similarly, providing the presence information 313 related to the first entity to the second entity 315 can comprise providing one or more of a Rich Site Summary (RSS) feed, an email message, a Short Message Service (SMS) message, a Multimedia Message Service (MMS) message, an Instant Message (IM), or a web page.

Stated another way, the presence information service 305 can be adapted to maintain, for example in a database or other repository, a set of presence information 325 for one or more principals including at least the presence information related to the first entity 310. Maintaining the set of presence information 325 can comprise updating the set of presence information 325 based on the received presence information 312 related to the first entity 310 and one or more policies 335, for example via policy enforcement module 330. Providing the presence information 313 related to the first entity to the second entity device 315 can comprise providing a notification of a change in the presence information for the first entity. Additionally or alternatively, the presence information service 305 is further adapted to receive a request for the presence information related to the first entity from the second entity device 315. In such a case, the presence information service 305 can be adapted to provide the presence information related to the first entity to the second entity device 315 in response to the request. Providing the presence information related to the first entity to the second entity, either in the form of a notification or in response to a request, can be based on one or more policies 335 enforced by policy enforcement module 330, e.g., for authentication, authorization, etc. That is, one or more policies 335 can be maintained and applied by the policy enforcement module 330 of the presence information service 305 when receiving and/or providing the presence information. Such policies 335 can be used, for example, to perform authentication and/or authorization, to determine who can access the presence information, what presence information can be distributed, how it can or should be transformed before being distributed, etc.

Figure 4:
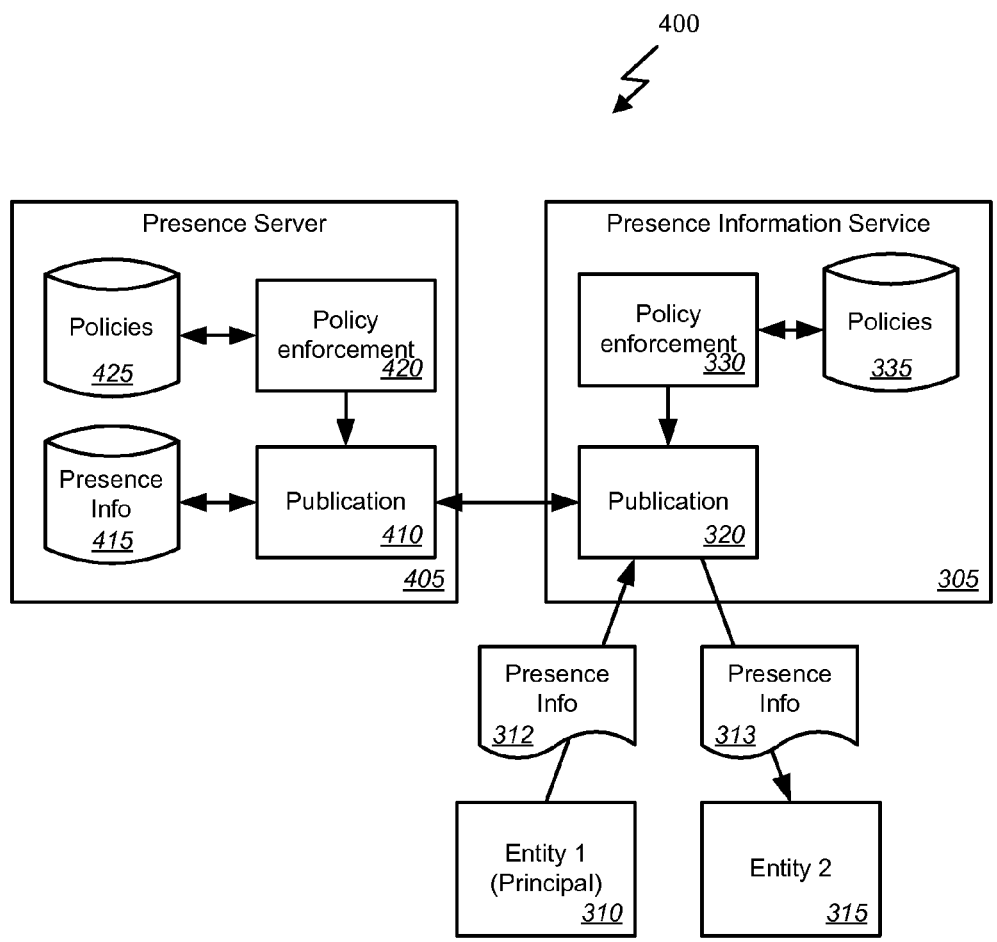
FIG. 4 is a block diagram illustrating, at a high-level, functional components of a system for providing global presence information according to an alternative embodiment of the present invention.

FIG. 4 is a block diagram illustrating, at a high-level, functional components of a system for providing global presence information according to an alternative embodiment of the present invention. In this example, the system 400 further includes a presence server 405 of presence network that can be used by the presence information service 305 to maintain the presence information for the principal. In this example, the presence information service 305 receives the presence information 312 from the principal, i.e., the device of the first entity 310, and then publishes that information to the presence server 405, in some cases based on one or more policies 335 applied by the policy enforcement module 330 of the presence information service 305. The presence server 405 can receive and maintain the presence information for the principal, for example in a database or other repository of presence information 415. For example, the presence server 405 can update the presence information 415 based on one or more policies 425 applied by the policy enforcement module 425 of the policy server 405. It should be noted that the policies of the presence server 405 can be applied in addition to or instead of the policies 335 of the presence information service 305 depending upon the exact implementation. Either as a notification of a change, in response to a query or upon the occurrence of another event or condition, the presence server 405 can provide presence information for the principal to the presence information service, for example via publication module 405. The presence information service 310 can then provide the presence information from the presence server 405 to another entity, i.e., the second entity 315, either as a notification or in response to a query via publication module 320 and based on one or more policies 335 applied by the policy enforcement module 330 of the presence information service 305.

Again, receiving presence information 312 related to the first entity 310 can comprise receiving the presence information 312 related to the first entity 301 according to a constrained schema or as unconstrained data. The presence information 312 related to the first entity 310, either constrained or unconstrained, can be received in one or more of a Short Message Service (SMS) message, a Multimedia Message Service (MMS) message, an email message, an Instant Message (IM), a forum post, a blog post, a document upload, or other communication. Similarly, providing the presence information 313 related to the first entity 310 to the second entity 315 can comprise providing one or more of a Rich Site Summary (RSS) feed, an email message, a Short Message Service (SMS) message, a Multimedia Message Service (MMS) message, an Instant Message (IM), or a web page.

Stated another way, the system 400 can further comprise a presence server 405 of a presence network. In such a case, the presence information service 305 can maintain the set of presence information 415 by providing the presence information 312 from the presence information service 305 to the presence server 405. For example, maintaining the set of presence information 415 can comprise maintaining the set of presence information 415 with the presence server 405, e.g., in a database or other repository, wherein the presence information service 305 provides the presence information 312 related to the first entity 310 to the presence server 405, and wherein the presence server 405 updates the set of presence information 415 based on the presence information 312 related to the first entity 310 and one or more policies 425. Further, the presence server 405 can provide the presence information related to the first entity 310 to the presence information service 305, e.g., periodically, in response to a request, or based on some other occurrence, condition, etc. The presence information service 305 can in turn provide the presence information 313 related to the first entity 310 to the second entity device 315. Again, maintaining the set of presence information 415 can comprise updating the set of presence information 4155 based on the received presence information 312 related to the first entity 310 and one or more policies 335 of the presence information service 305 and/or policies 425 of the presence server 405.

Figure 5:
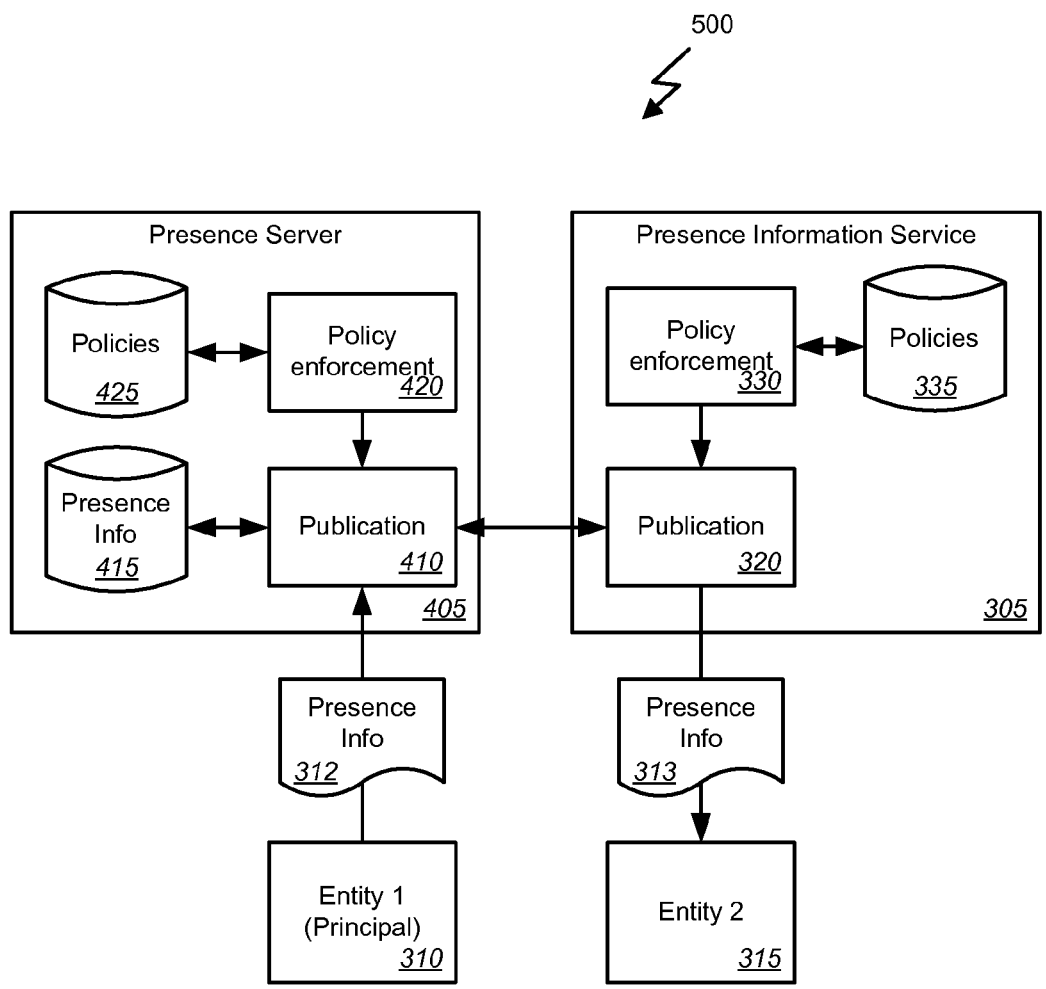
FIG. 5 is a block diagram illustrating, at a high-level, functional components of a system for providing global presence information according to yet another alternative embodiment of the present invention.

FIG. 5 is a block diagram illustrating, at a high-level, functional components of a system for providing global presence information according to yet another alternative embodiment of the present invention. In this example, the system 400 further includes a presence server 405 of presence network that can be used by the presence information service 305 to maintain the presence information for the principal. In this example, the presence server 405 receives the presence information 312 from the principal, i.e., the device of the first entity 310, and then publishes that information to the presence server 405, in some cases based on one or more policies 425 applied by the policy enforcement module 420 of the presence server 405. The presence server 405 can receive and maintain the presence information for the principal, for example in a database or other repository of presence information 415. For example, the presence server 405 can update the presence information 415 based on one or more policies 425 applied by the policy enforcement module 425 of the policy server 405. Either as a notification of a change, in response to a query or upon the occurrence of another event or condition, the presence server 405 can provide presence information for the principal to the presence information service 305, for example via publication module 405. The presence information service 310 can then provide the presence information 313 from the presence server 405 to another entity, i.e., the second entity 315, either as a notification or in response to a query via publication module 320 and based on one or more policies 335 applied by the policy enforcement module 330 of the presence information service 305.

Again, receiving presence information 312 related to the first entity 310 can comprise receiving the presence information 312 related to the first entity 301 according to a constrained schema or as unconstrained data. The presence information 312 related to the first entity 310, either constrained or unconstrained, can be received in one or more of a Short Message Service (SMS) message, a Multimedia Message Service (MMS) message, an email message, an Instant Message (IM), a forum post, a blog post, a document upload, or other communication. Similarly, providing the presence information 313 related to the first entity 310 to the second entity 315 can comprise providing one or more of a Rich Site Summary (RSS) feed, an email message, a Short Message Service (SMS) message, a Multimedia Message Service (MMS) message, an Instant Message (IM), or a web page.

Stated another way, the system 500 can further comprise a presence server 405 of a presence network which can receive the presence information 312 related to the first entity from the first entity device 310 and maintain a set of presence information 415 for one or more principals including at least the presence information 312 related to the first entity 310. For example, the presence server 405 can be adapted to update the set of presence information 415 based on the presence information 312 related to the first entity and one or more policies 425. The presence server 405 can be adapted to provide the presence information related to the first entity to the presence information service 305, which in turn can provide the presence information 313 related to the first entity to the second entity 315 via publication module 320 and based on one or more policies 335.

Figure 6:
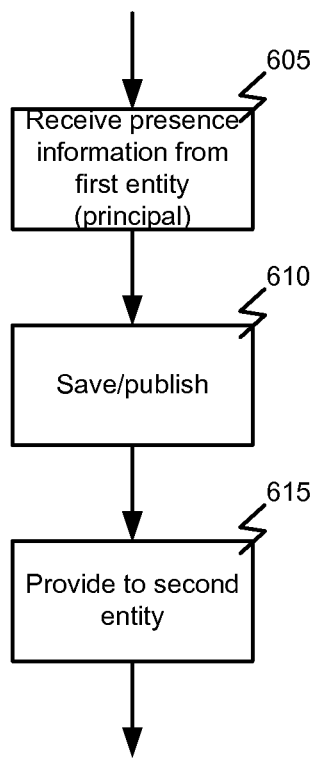
FIG. 6 is a flowchart illustrating an exemplary process for providing presence information for a principal according to one embodiment of the present invention.

FIG. 6 is a flowchart illustrating an exemplary process for providing presence information for a principal according to one embodiment of the present invention. In this example, processing begins with receiving 605 presence information related to a first entity from a device without a presence agent at a presence information service. As noted above, receiving presence information related to the first entity can comprise receiving the presence information related to the first entity according to a constrained schema or as unconstrained data. The presence information related to the first entity, either constrained or unconstrained, can be received in one or more of a Short Message Service (SMS) message, a Multimedia Message Service (MMS) message, an email message, an Instant Message (IM), a forum post, a blog post, a document upload, or other communication. Furthermore, depending upon the implementation, receiving the presence information related to the principal can be performed by the presence information service or a presence server which in turn provides the presence information for the principal to the presence information service.

The received presence information can be saved or published 610 by the presence information service or presence server depending upon the implementation as described above. Also as noted above, saving or publishing 610 the presence information can be based on one or more policies applied by the presence information service and/or presence server as described above. That is, one or more policies can be maintained and applied by the presence information service or other system(s) when receiving and/or publishing 610 the presence information. Such policies can be used, for example, to perform authentication and/or authorization of the publisher etc.

The presence information related to the first entity can be provided 615 from the presence information service to a second entity. As noted above and depending upon the implementation, the presence information can be provided 615 to the second entity from the presence information service or the presence server via the presence information service. Providing 615 the presence information related to the principal to another entity, either as a notification or in response to a query, can comprise providing one or more of a variety of different messages including but not limited to a Rich Site Summary (RSS) feed, an email message, a Short Message Service (SMS) message, a Multimedia Message Service (MMS) message, an Instant Message (IM), or a web page via any one or more of a variety of possible communication channels. The presence information can be provided 615 in the form of a notification to one or more subscribers or in response to a request from another authorized entity. Further, providing 615 the presence information can be based on the application of one or more policies. Such policies can be used, for example, to perform authentication and/or authorization, to determine who can access the presence information, what presence information can be distributed, how it can or should be transformed before being distributed, etc.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method of providing presence information for a principal, the method comprising:

receiving a message at a presence information service without use of a presence agent, presence network, or presence server, wherein the message includes unconstrained presence information related to a first entity and wherein the message comprises one or more of a Short Message Service (SMS) message, a Multimedia Message Service (MMS) message, an email message, an Instant Message (IM), a forum post, a blog post, or a document upload;

maintaining a set of presence information for one or more principals with the presence information service, the set of presence information comprising a Binary Large Object (BLOB) including at least the presence information related to the first entity, wherein maintaining the set of presence information comprises updating the set of presence information in the BLOB with the presence information related to the first entity from the received message and one or more policies; and providing the presence information related to the first entity from the presence information service to a second entity without use of a presence network or presence server, wherein providing the presence information related to the first entity to the second entity comprises providing the presence information maintained in the BLOB in one or more of a Rich Site Summary (RSS) feed, an email message, a Short Message Service (SMS) message, a Multimedia Message Service (MMS) message, an Instant Message (IM), or a web page.

2. The method of claim 1, wherein providing the presence information related to the first entity to the second entity device comprises providing a notification of a change in the presence information for the first entity.

3. The method of claim 2, wherein providing a notification of a change in the presence information related to the first entity is based on one or more policies.

4. The method of claim 1, further comprising receiving a request for the presence information related to the first entity and wherein providing the presence information related to the first entity to the second entity is performed in response to the request.

5. The method of claim 4, wherein providing the presence information related to the first entity to the second entity is based on one or more policies.

6. The method of claim 1, wherein the maintaining the set of presence information comprises saving the presence information in a database.

7. The method of claim 1, wherein providing the presence information related to the first entity to the second entity device comprises providing the presence information related to the first entity via a web service.

8. The method of claim 1, wherein maintaining the set of presence information comprises providing the presence information from the presence information service to a presence server of a presence network.

9. A system comprising:

a first entity device;

a second entity device; and a presence information service adapted to receive a message from the first entity device without use of a presence agent, presence network, or presence server, wherein the message includes unconstrained presence information related to a first entity and wherein the message comprises one or more of a Short Message Service (SMS) message, a Multimedia Message Service (MMS) message, an email message, an Instant Message (IM), a forum post, a blog post, or a document upload, maintaining a set of presence information for one or more principals with the presence information service, the set of presence information comprising a Binary Large Object (BLOB) including at least the presence information related to the first entity, wherein maintaining the set of presence information comprises updating the set of presence information in the BLOB with the presence information related to the first entity from the received message and one or more policies and provide the presence information related to the first entity to the second entity device without use of a presence network or presence server, wherein providing the presence information related to the first entity to the second entity comprises providing the presence information maintained in the BLOB in one or more of a Rich Site Summary (RSS) feed, an email message, a Short Message Service (SMS) message, a Multimedia Message Service (MMS) message, an Instant Message (IM), or a web page.

10. A computer-readable memory comprising a set of instructions stored therein which, when executed by a processor, causes the processor to provide presence information for a principal by:

receiving a message at a presence information service without use of a presence agent, presence network, or presence server, wherein the message includes unconstrained presence information related to a first entity and wherein the message comprises one or more of a Short Message Service (SMS) message, a Multimedia Message Service (MMS) message, an email message, an Instant Message (IM), a forum post, a blog post, or a document upload;

maintaining a set of presence information for one or more principals with the presence information service, the set of presence information comprising a Binary Large Object (BLOB) including at least the presence information related to the first entity, wherein maintaining the set of presence information comprises updating the set of presence information in the BLOB with the presence information related to the first entity from the received message and one or more policies; and providing the presence information related to the first entity from the presence information service to a second entity without use of a presence network or presence server, wherein providing the presence information related to the first entity to the second entity comprises providing the presence information maintained in the BLOB in one or more of a Rich Site Summary (RSS) feed, an email message, a Short Message Service (SMS) message, a Multimedia Message Service (MMS) message, an Instant Message (IM), or a web page.

* * * * *